Figure 4:
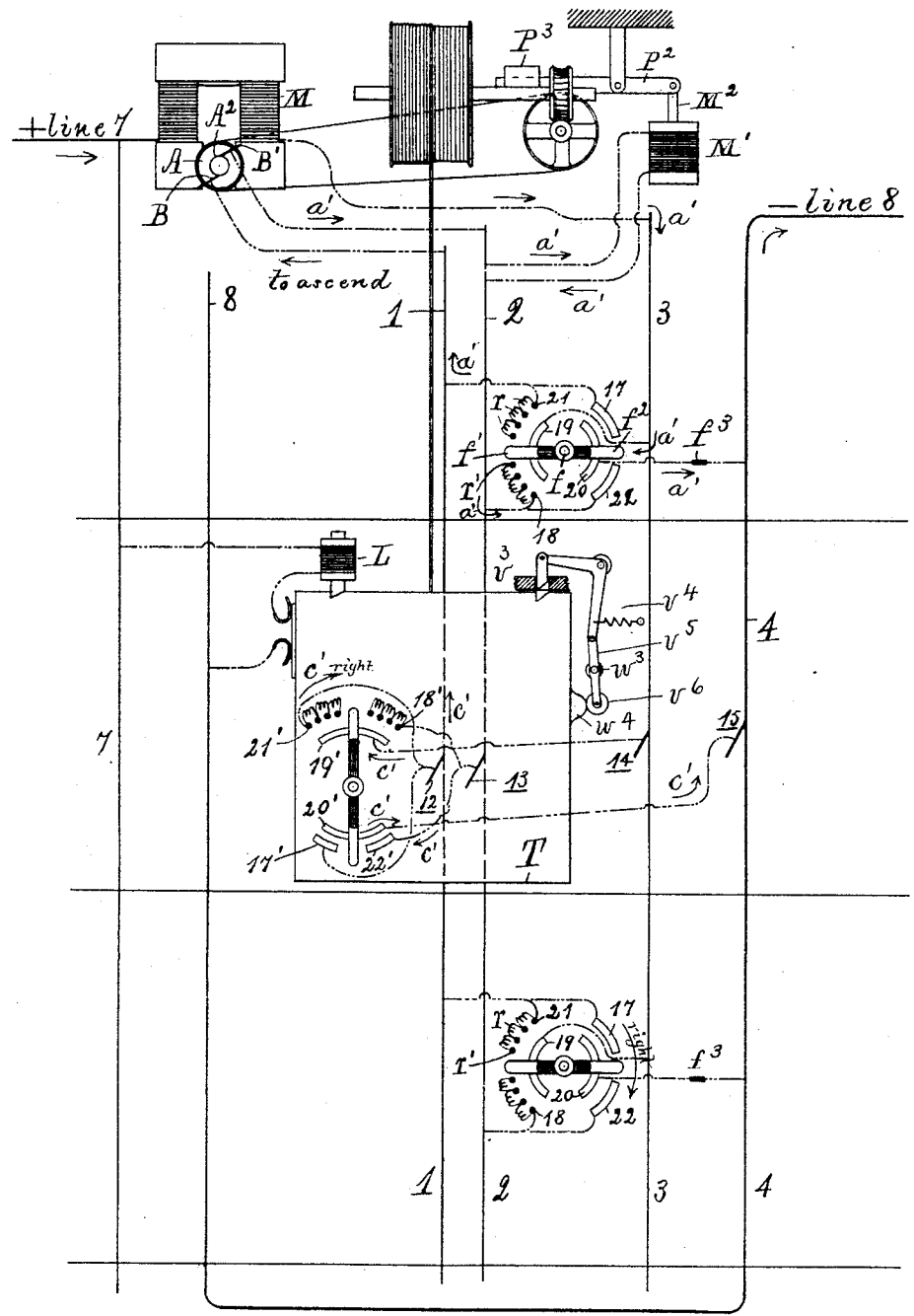

(No Model.) 14 Sheets—Sheet 1.
W. BAXTER, Jr.
SYSTEM OF OPERATING ELECTRIC ELEVATORS.
No. 449,611. Patented Mar. 31, 1891.
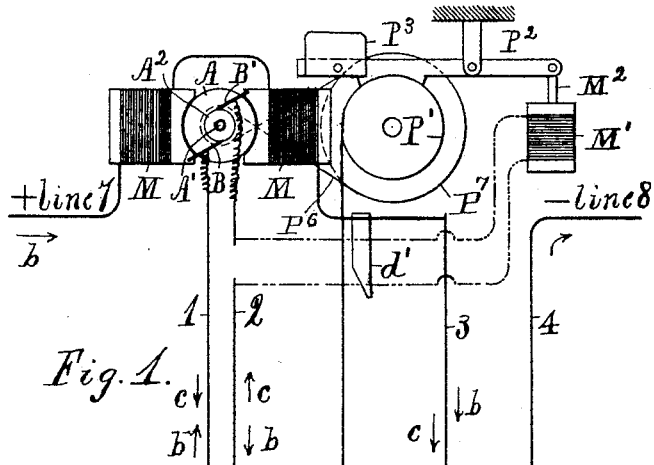
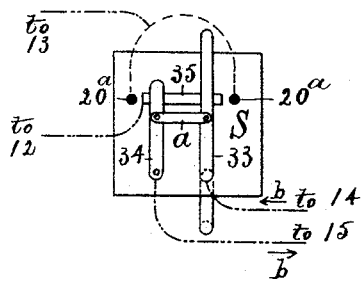
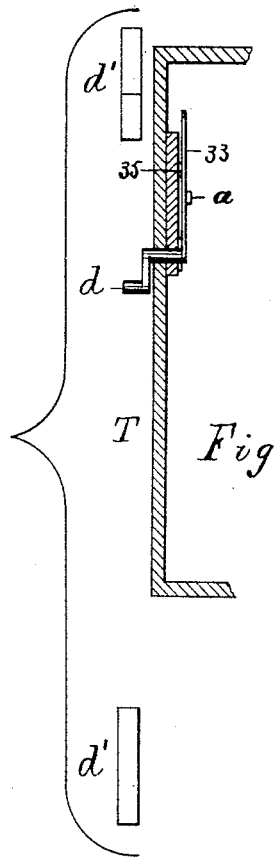
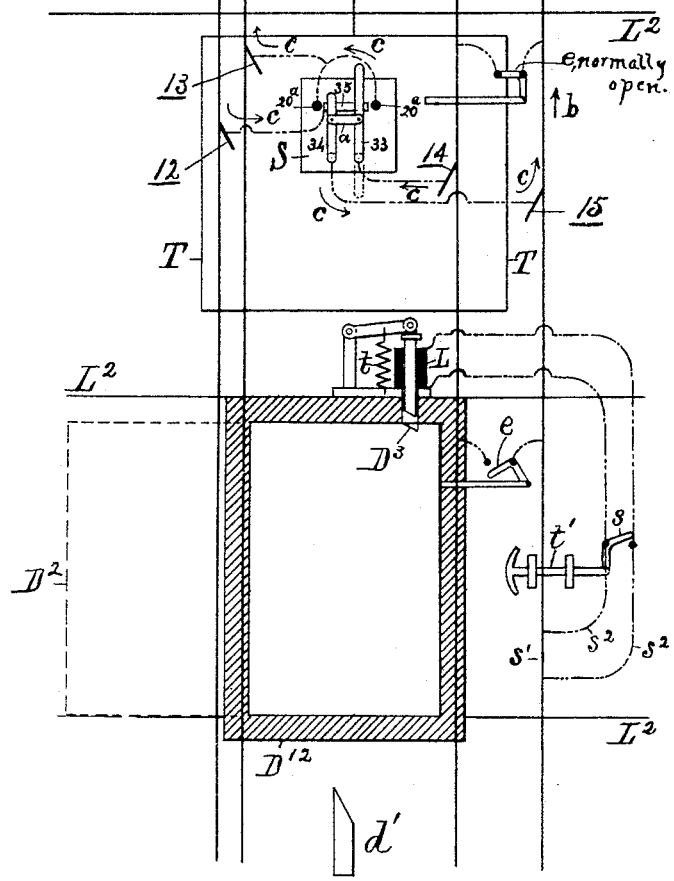
Attest:
L. Loll.
F. C. Fischer
Inventor.
William Baxter, Jr.,
per Crane & Miller, Attys.

(No Model.) 14 Sheets—Sheet 2.

W. BAXTER, Jr.
SYSTEM OF OPERATING ELECTRIC ELEVATORS.

No. 449,611. Patented Mar. 31, 1891.

Attest:
L. Lee,
F. C. Fischer

Inventor.
William Baxter, Jr.,
per Crane & Miller, Attys.

(No Model.) 14 Sheets—Sheet 9.

W. BAXTER, Jr.
SYSTEM OF OPERATING ELECTRIC ELEVATORS.

No. 449,611. Patented Mar. 31, 1891.

Attest:
L. Lee.
F. C. Fischer

Inventor.
William Baxter, Jr.,
per Crane & Miller, Attys.

(No Model.) 14 Sheets—Sheet 11.
W. BAXTER, Jr.
SYSTEM OF OPERATING ELECTRIC ELEVATORS.
No. 449,611. Patented Mar. 31, 1891.

Attest:
L. Lee.
F. C. Fischer.

Inventor.
William Baxter, Jr.,
per Crane & Miller, Attys.

(No Model.) 14 Sheets—Sheet 12.
W. BAXTER, Jr.
SYSTEM OF OPERATING ELECTRIC ELEVATORS.

No. 449,611. Patented Mar. 31, 1891.

Attest:
L. Lee.
F. C. Fischer.

Inventor.
William Baxter, Jr.,
per Crane & Miller, Attys.

(No Model.) 14 Sheets—Sheet 13.
W. BAXTER, Jr.
SYSTEM OF OPERATING ELECTRIC ELEVATORS.

No. 449,611. Patented Mar. 31, 1891.

Attest:
L. Lee.
F. C. Fischer.

Inventor.
William Baxter, Jr.,
per Crane & Miller, attys.

(No Model.) 14 Sheets—Sheet 14.

W. BAXTER, Jr.
SYSTEM OF OPERATING ELECTRIC ELEVATORS.

No. 449,611. Patented Mar. 31, 1891.

Attest:
L. Lee.
F. C. Fischer.

Inventor.
William Baxter, Jr.,
per Crane & Miller, atty.

UNITED STATES PATENT OFFICE.

WILLIAM BAXTER, JR., OF BALTIMORE COUNTY, MARYLAND.

SYSTEM OF OPERATING ELECTRIC ELEVATORS.

SPECIFICATION forming part of Letters Patent No. 449,611, dated March 31, 1891.

Application filed March 17, 1888. Serial No. 267,524. (No model.)

*To all whom it may concern:*

Be it known that I, WILLIAM BAXTER, Jr., a citizen of the United States, residing in the ninth election district of the county of Baltimore, State of Maryland, have invented certain new and useful Improvements in Systems of Operating Electric Elevators, fully described and represented in the following specification and the accompanying drawings, forming a part of the same.

This invention relates to a system for actuating elevator-hoisting mechanism by the energy of an electric current, and is adapted without modifications, except in immaterial mechanical details, to move the car or platform in either a vertical or an inclined path. The devices described herein are intended for use with a stationary hoisting device having a rotating drum or pulley to actuate a rope for raising the car or platform by which the load is carried, and the construction or mode of operation of the hoisting device is entirely immaterial. The car may be counterbalanced or not, and the hoisting-rope may be wound upon the drum or simply turned about a pulley and actuated by a frictional contact therewith, as the object of my appliances is to stop and start or reverse the movements of the hoisting mechanism, whatever its nature, by the current in a main electric circuit and branch circuits derived therefrom and controlled by suitable switches located therein and fixed upon the car or the hoistway-landings.

The invention involves the use of an operative electric circuit the current in which is controlled by switches located either upon the car or at stations along the path of the car and operated to affect the hoisting mechanism in the desired manner to raise or lower the car or to stop the same at pleasure.

Heretofore motors have been used to operate hoisting mechanism, and if connected therewith the armature would be turned in a reverse direction by the descent of the weighted platform, with a view of converting the motor into a generator and to store up the current thus produced for future use. I do not claim such mode of operation; but in one modification of my invention I construct the circuits and switches so that the motions of the motor may be reversed at the pleasure of the operator for the purpose of actuating the hoisting apparatus in reverse directions to raise or lower the car, as desired. Such construction is more simple than when the motor is alternately employed as a generator, and is more suitable for use in a circuit derived from a central station for the distribution of light or power in which other electrical apparatus would also be connected. In such a circuit the current employed is unavoidably furnished with a current of constant potential or constant strength, and in such case the motor-circuit and the contacts in the switches require to be arranged in a suitable manner to avoid in the one case making a short circuit and in the other case making an open circuit. Such arrangements are fully shown herein; but it is obvious that others may be used without departing from my invention.

The means for carrying out my invention consist, partly, in such an arrangement of the circuit-wires and switches that the action of the hoisting mechanism may be controlled from the car when it is in motion or standing still; partly in such an arrangement of the circuit-wires and switches that the hoisting mechanism may be controlled from any desired station along the path of the car; partly in such an arrangement of the circuit-wires and switches that the opening of a door or gate opposite a car-landing will operate a switch to stop the action of the hoisting mechanism, and thereby prevent the car from leaving such landing until the door is closed; partly in an arrangement of circuits with a switch and indicator at the car-landing to show when the switch is turned whether the car is in motion; partly in an arrangement of circuits with a switch at the car-landing to be moved by the opening of the door, and adapted when thus moved to stop the car when it reaches such landing, and in a modification of the same in which the closing of the door would actuate the switch to automatically start the car upon its course; partly in magnetic locking devices and switches whereby the various landing-doors would be held closed until the car reached the landing at such door; partly in an arrangement of switches to stop the car at the opposite ends of its course or travel, and partly in the specific construction of the switches and their electrical connections, and in other details of construction. When the switch is located upon the car, the electric current may be conveyed thereto by means of sliding or rolling contact-pieces bearing upon stationary conductors placed along the path of the car, or by flexible cables containing suitable electric conductors. The operation of the electrical circuits is somewhat different when a constant current or constant potential is used in the circuits; but I have shown both constructions herein and claim the same generically, while I have claimed the particular arrangements for operating with a constant potential and fixed conductors, as well as the arrangements for using the constant current and the constant potential with a flexible conductor to the car in other applications, Serial No. 271,328, filed April 20, 1888, Serial No. 280,394, filed July 19, 1888, and Serial No. 284,397, filed September 3, 1888.

I have herein shown a variety of modifications to illustrate the scope of my invention.

Figure 5:
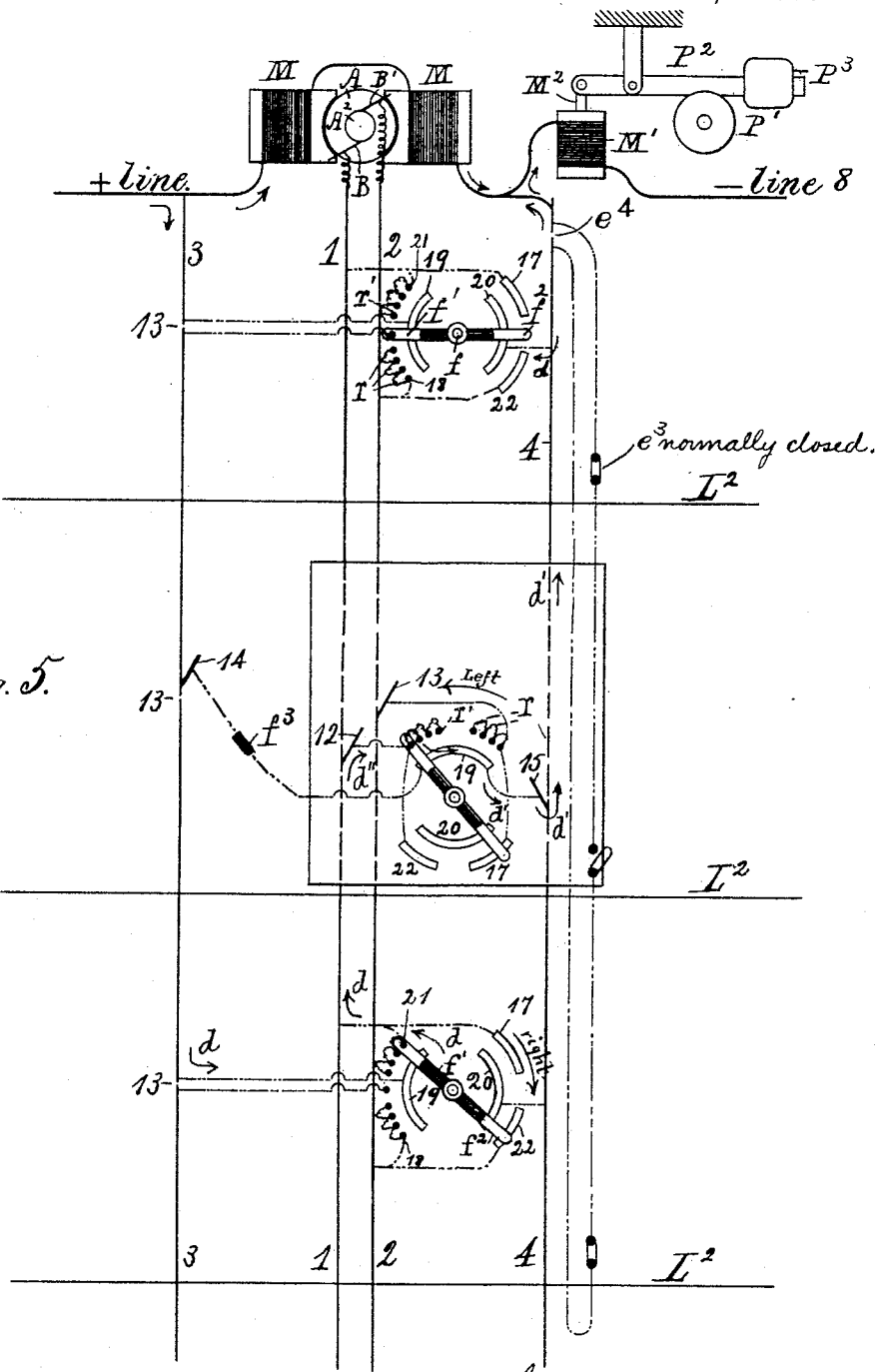
Figure 6:
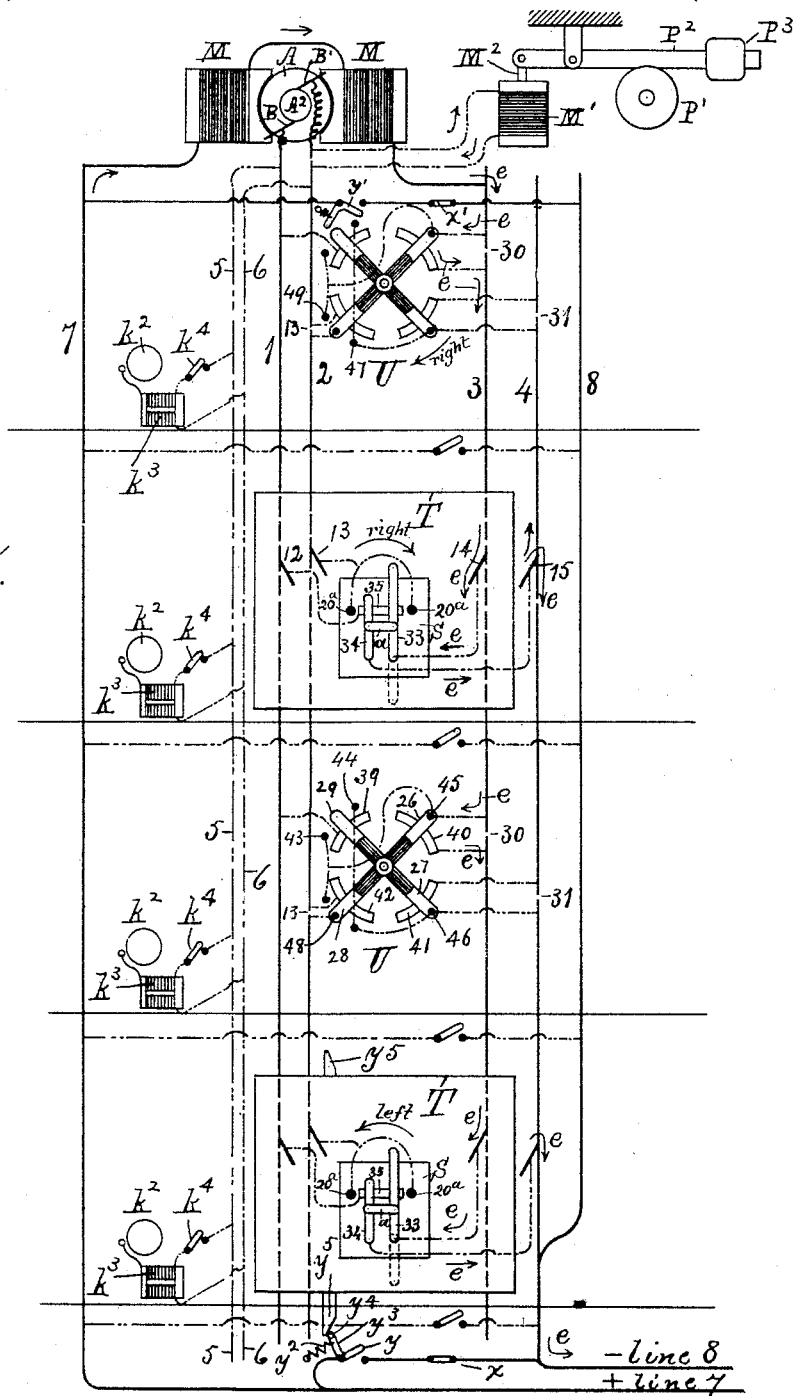
Figure 7:
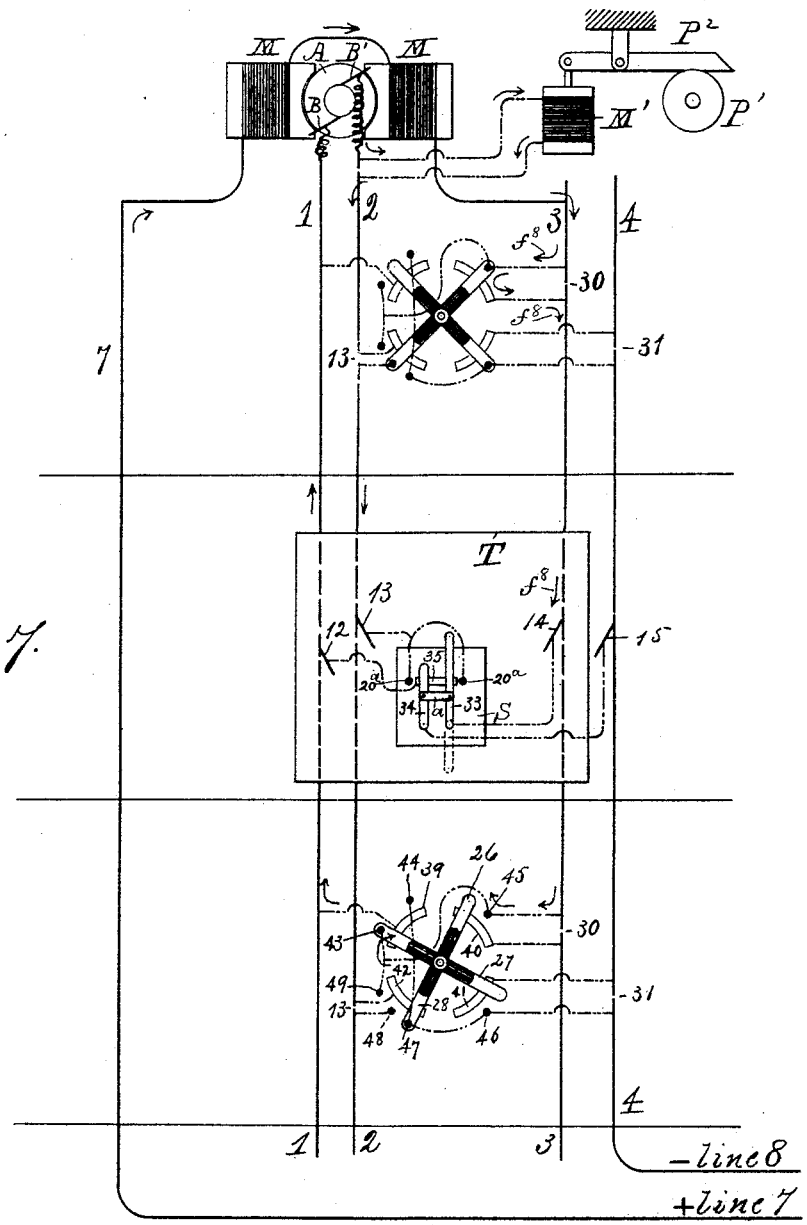
Figure 8:
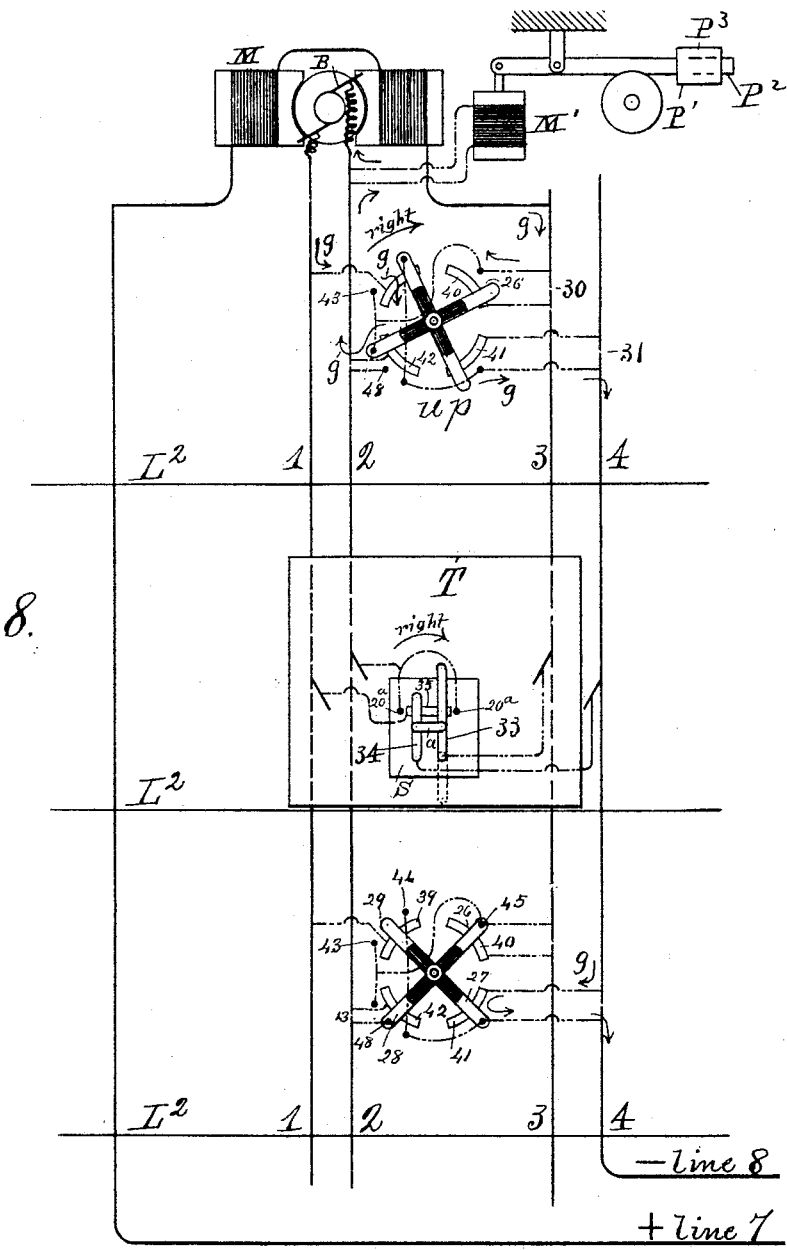
Figure 9:
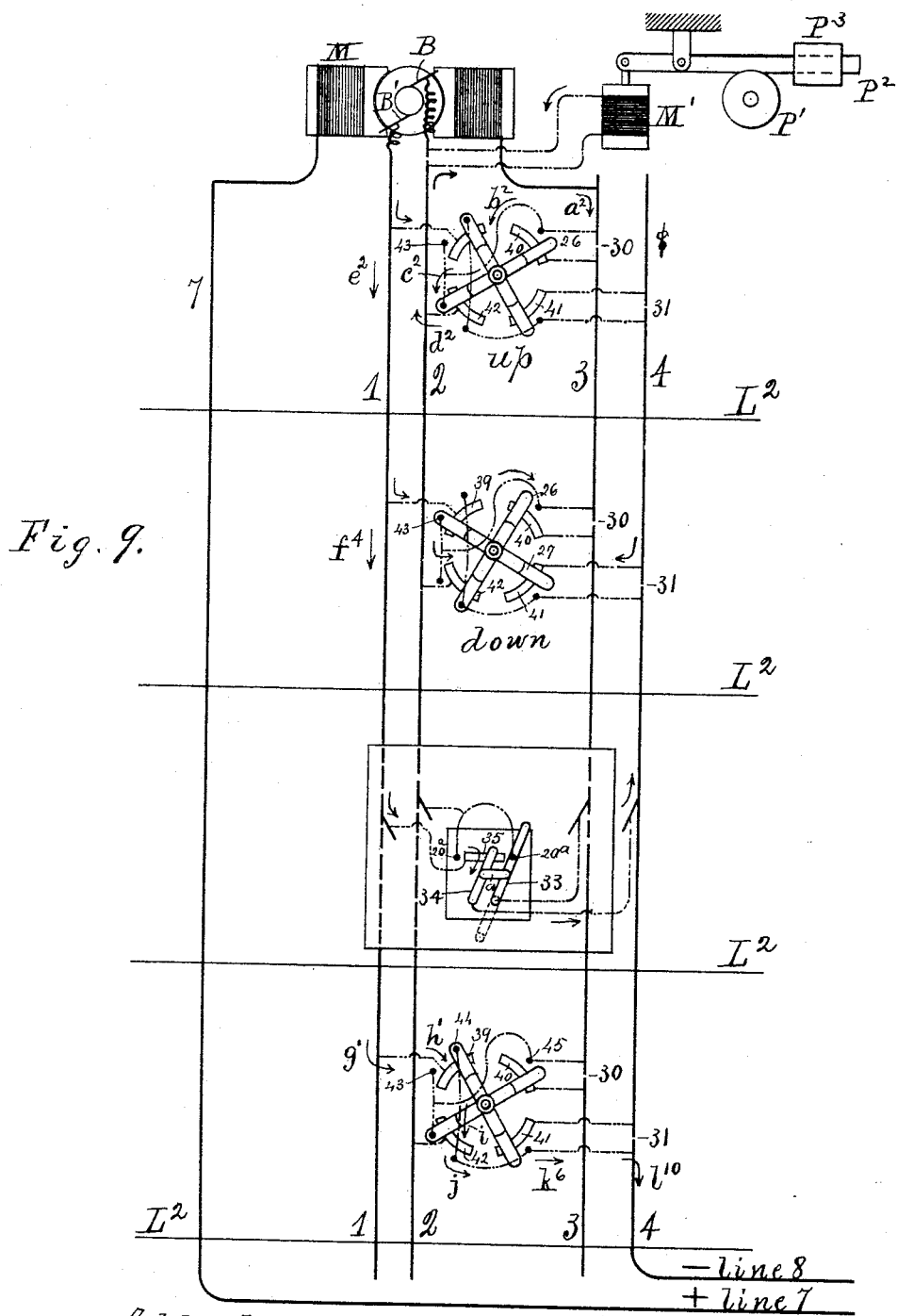
Figure 10:
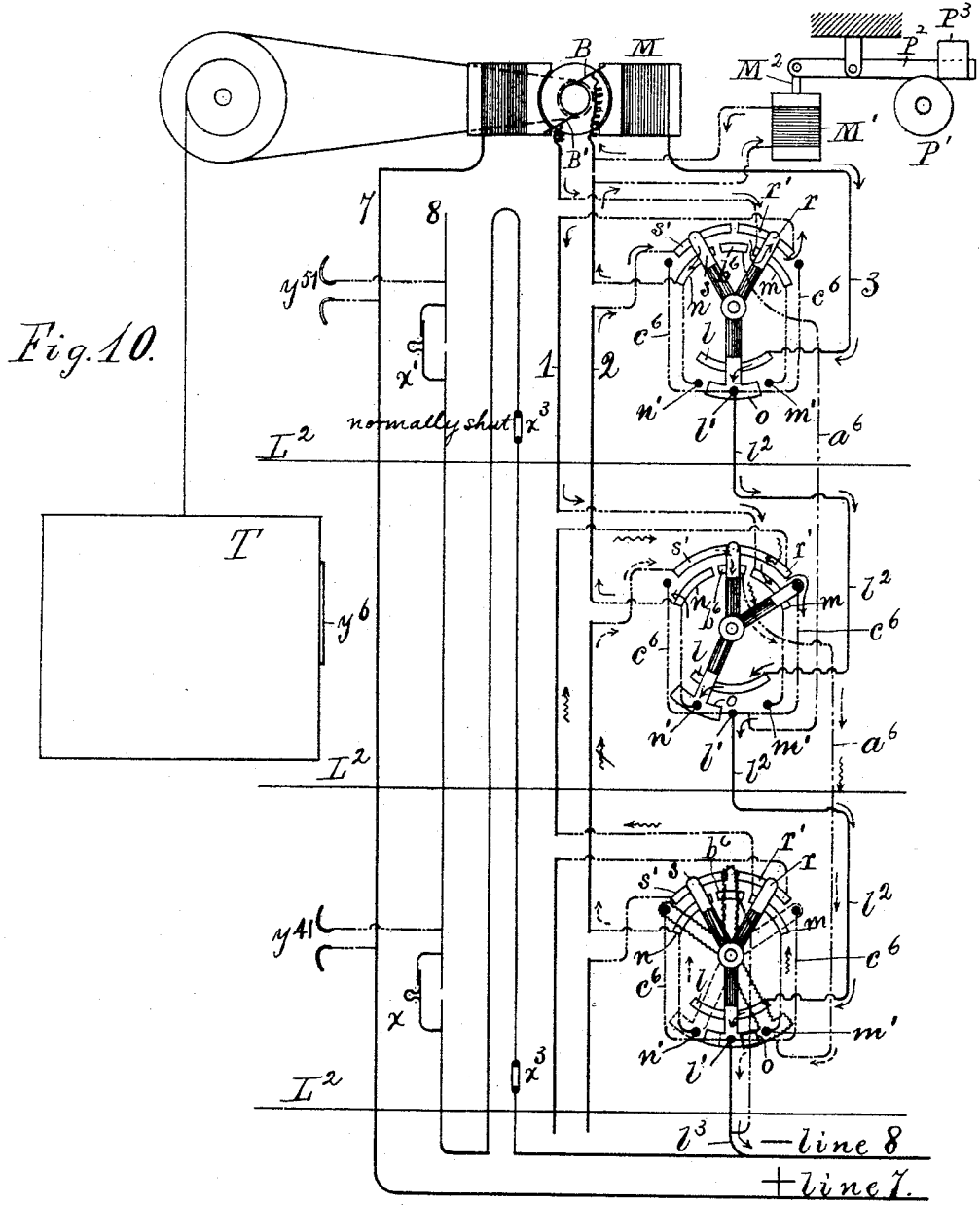
Figure 11:
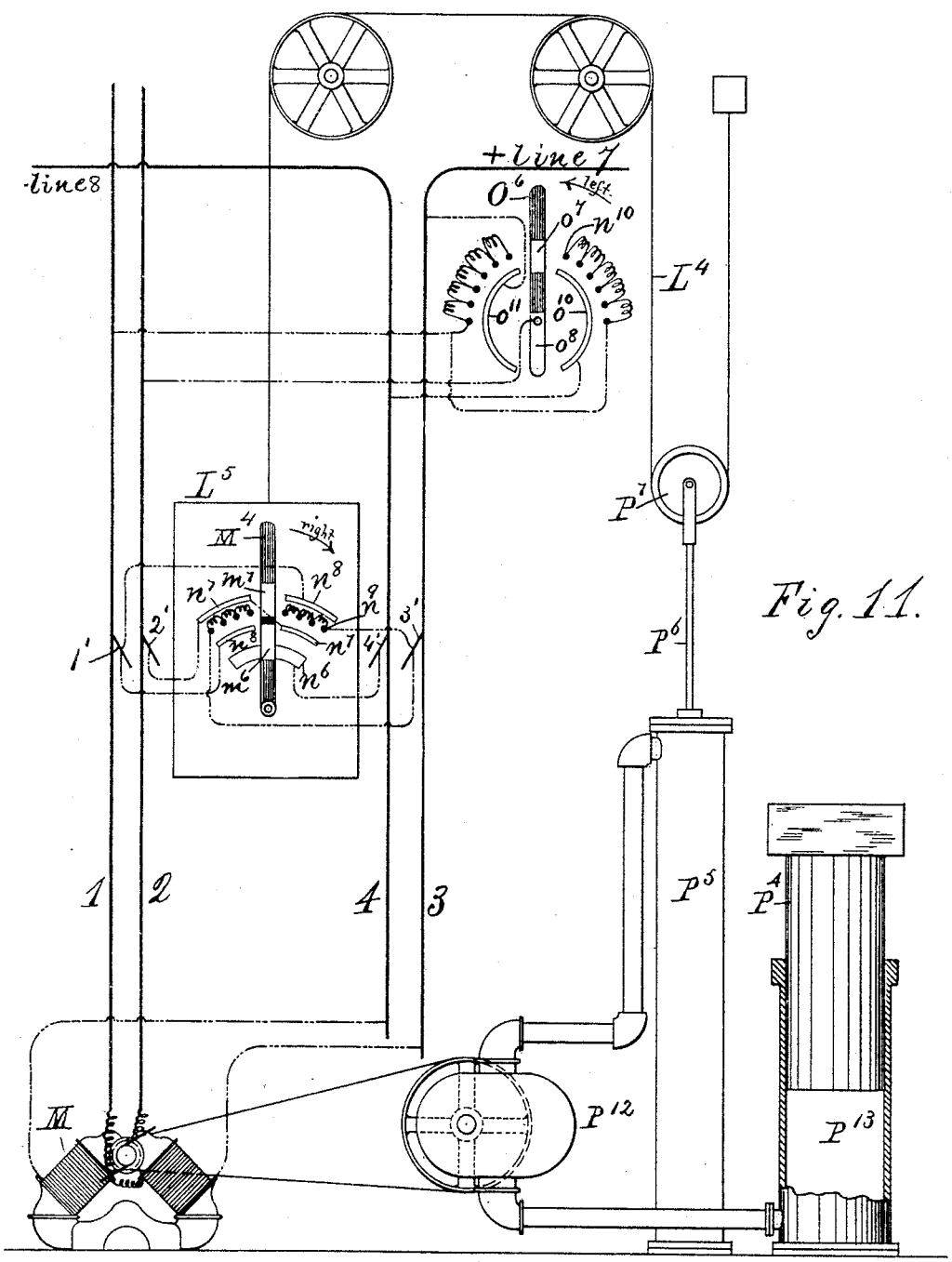
Figure 12:
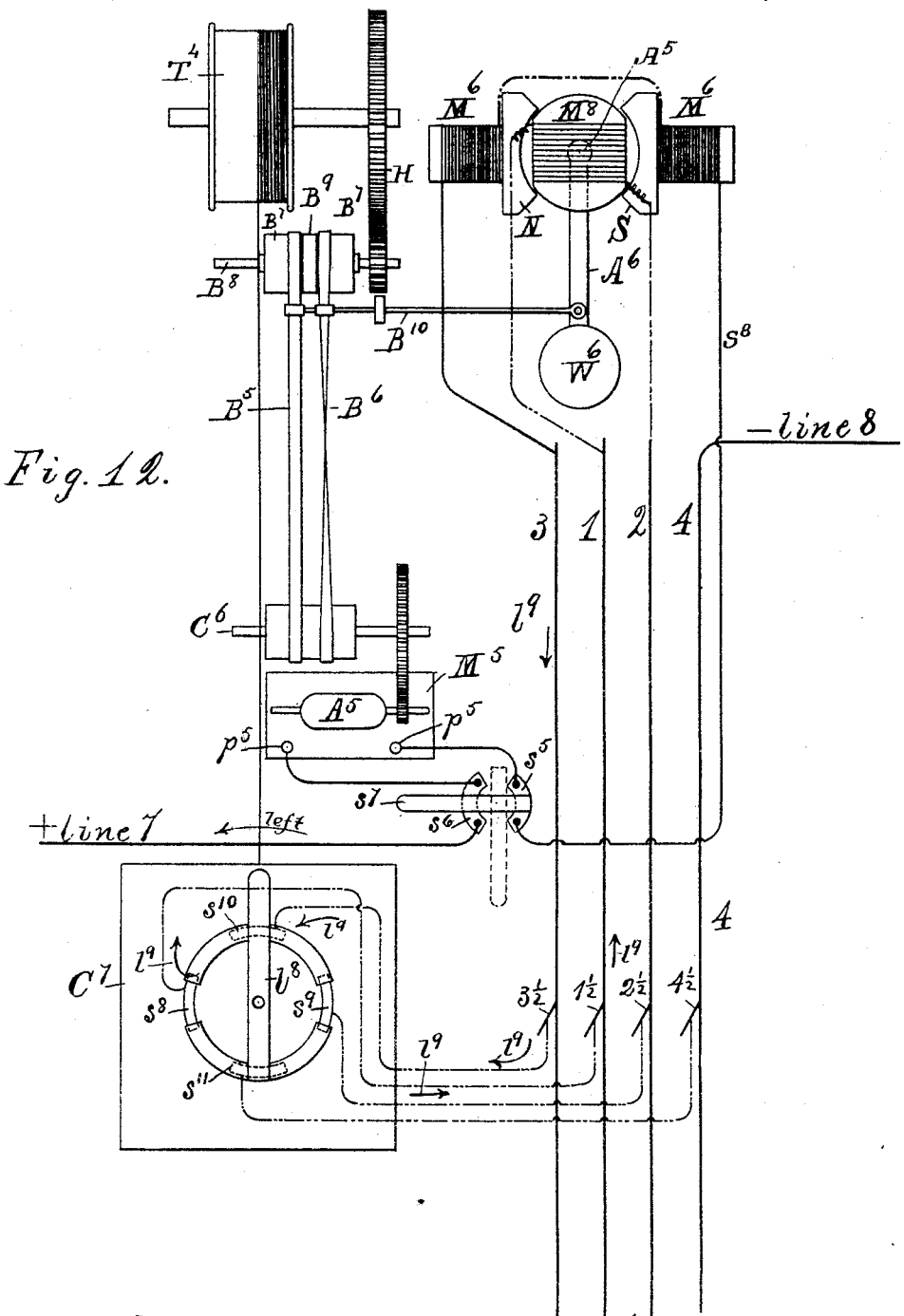
Figure 13:
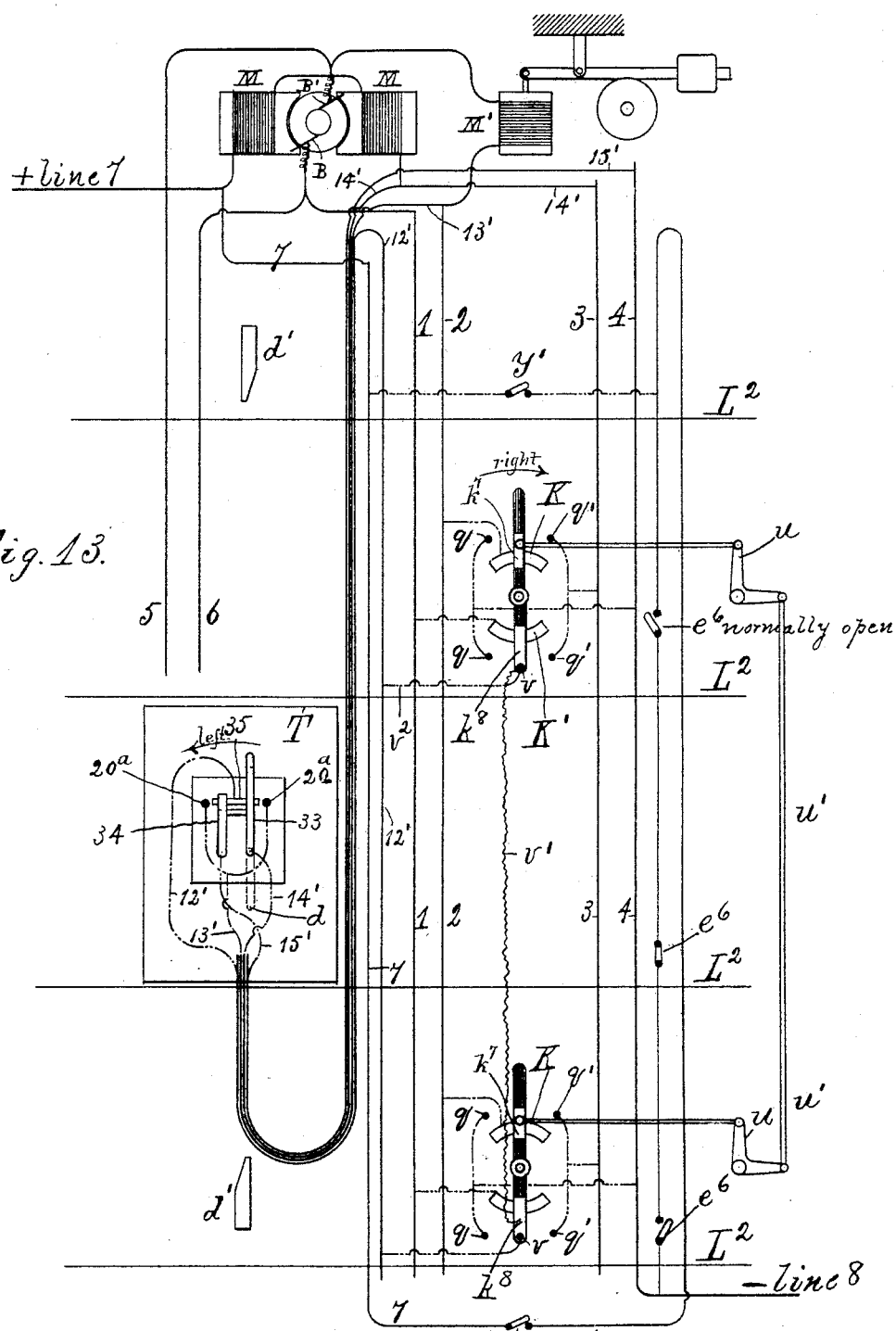
Figure 14:
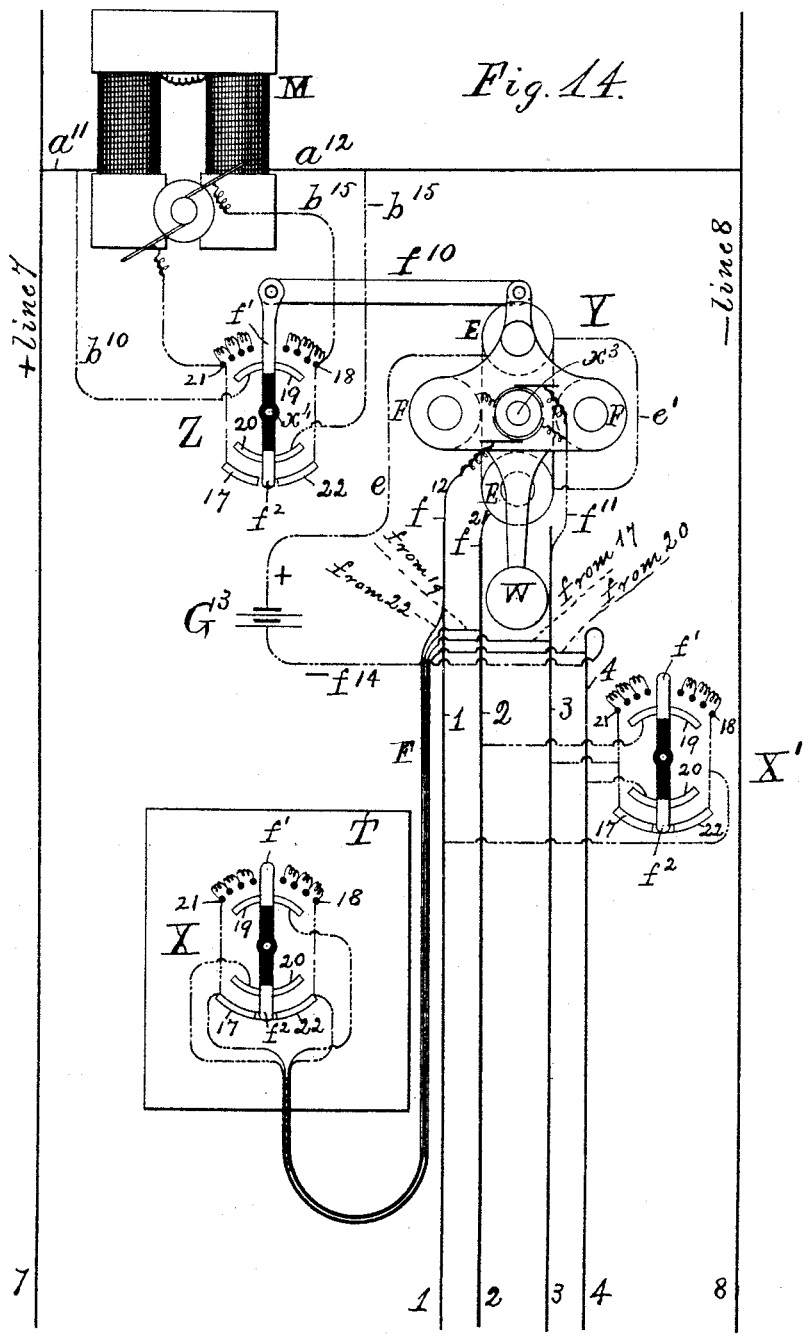
Figure 15:
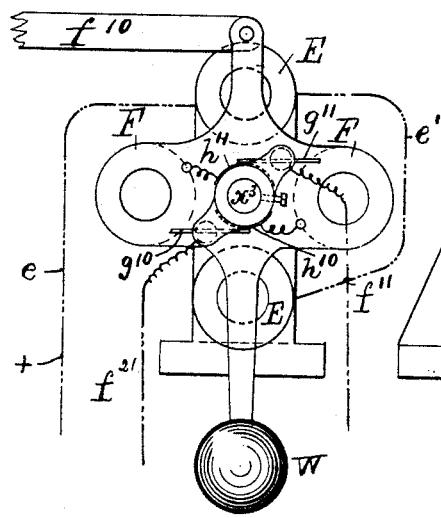
Figure 16:
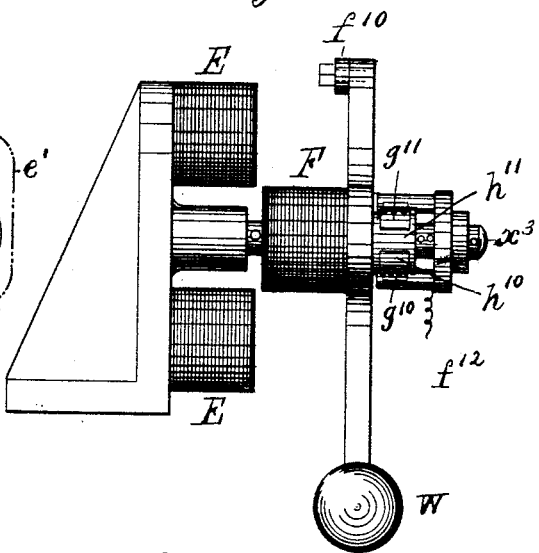
Figure 17:
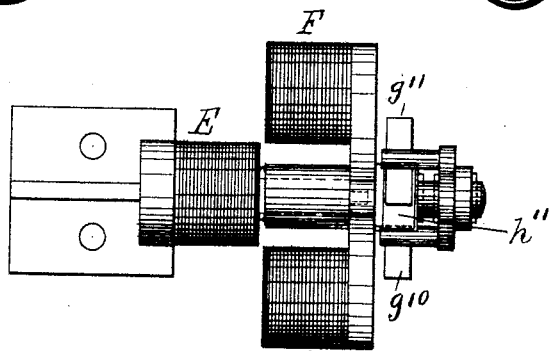
Figure 18:
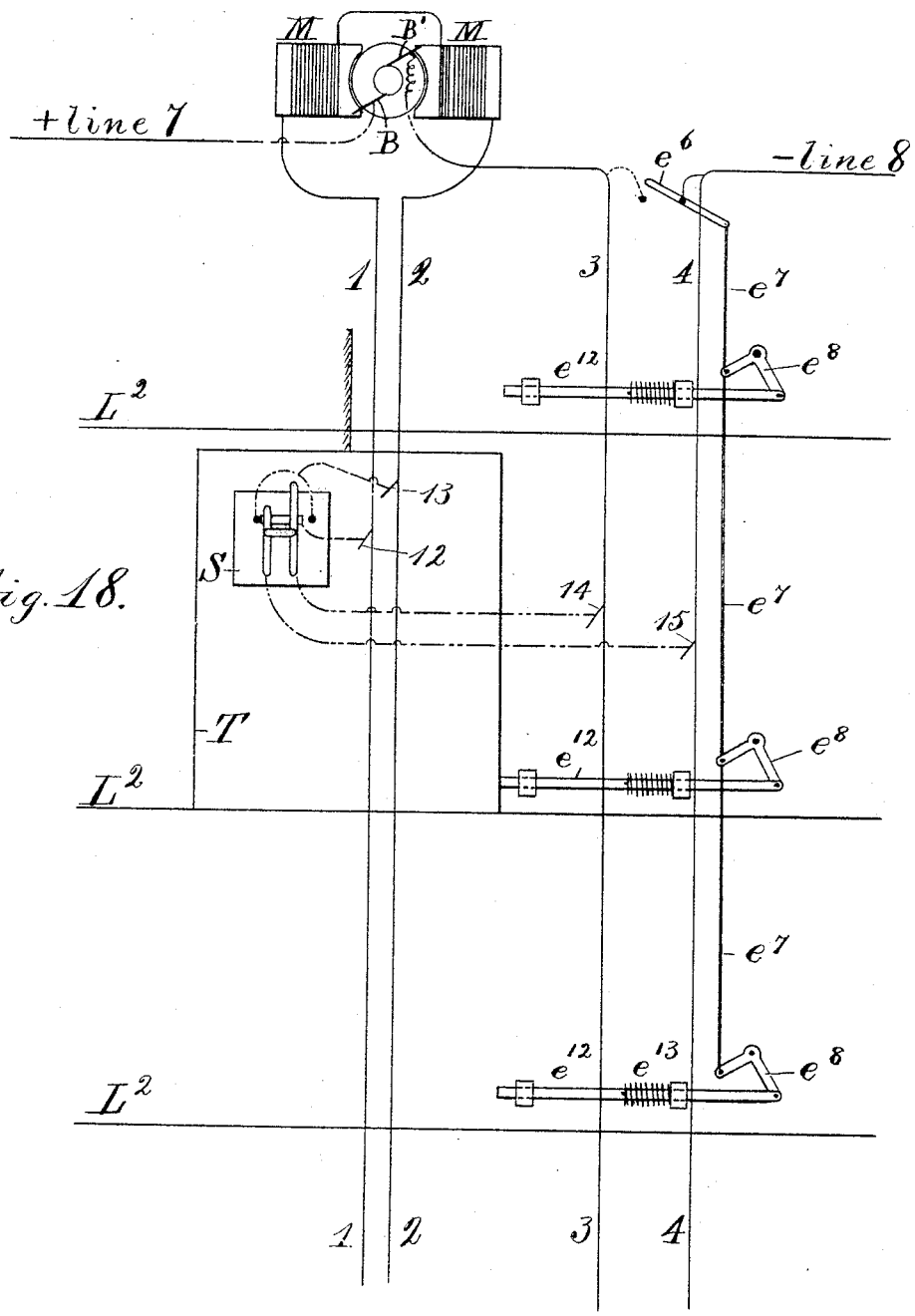

In the annexed drawings, Figure 1 represents an electric hoisting-machine with a diagram of the electrical connections required, with stationary conductors fixed along the hoistway and switches for operating with constant currents. Fig. 2 is a diagram of the car-switch upon a larger scale; and Fig. 3 is an edge view of the back of the car, upon a larger scale, in section, one pivot of the car-switch, the hand-lever and its attached crank end being shown in section, and two switches being shown in the same figure in a line with the pin upon said crank. Fig. 4 represents a diagram of an electric motor and the connections required with stationary conductors along the hoistway, and switches for operating the same with constant potential. Fig. 5 is a diagram of the motor with car and landing switches and connections for a constant-potential circuit, the lower landing-switch being turned to move the car in one direction, and the car-switch moved to actuate it in the opposite direction. Fig. 6 is a diagram of the motor with car and landing switches and connections for a constant-current circuit, the car being shown in two different positions in the hoistway. Fig. 7 is a similar diagram with the car between the two landings and its switch in the normal position with the lower landing-switch turned to bring the car down to such landing. Fig. 8 is a similar diagram with the upper landing-switch turned instead of the lower one. Fig. 9 is a similar diagram with three landing-switches and a car-switch, all turned from their normal positions. Fig. 10 is a diagram showing a motor and constant-current circuit having only landing-switches connected therewith. Fig. 11 represents an electric motor connected by belt with a reversible rotary pump and a hydraulic lifting apparatus, and electrical circuits for stationary conductors arranged along the hoistway, and switches for operating such circuits with constant potential. Fig. 12 is a diagram of an electric motor operating a counter-shaft and the latter connected with a hoisting-drum by straight and crossed driving-belts; a belt-shifter being applied to such belts and connected with a magnetic armature, and electric circuits and switches being shown for controlling the movement of such armature to shift the belts. Fig. 13 is a diagram of a stationary electric motor with circuits and switches adapted for conveying the electric current to and from the car through a flexible conductor or cable, the circuits and switches being constructed to operate with constant current. In all the figures above described the switches are shown operating directly upon the main motor-circuit or circuits derived therefrom; but in Fig. 14 is shown a construction for using an independent electrical generator and circuits connected with the moving car (and a switch thereon) by a flexible cable, the variations in the current produced by the switches upon the car or car-landing serving to actuate a magnetically-moved switch in the main motor-circuit, and thereby controlling the movements of the hoisting-motor in the desired manner. Fig. 15 is an enlarged view of the magnetic shifter; Fig. 16 an edge view of the same; Fig. 17, a plan of the same; Fig. 18, a diagram of the door-switches.

The current through the independent generator and circuits in such case is varied by the car-switch or landing-switch in the same manner as if it were the primary circuit through the electric motor; and my system of electrical connections and switches is therefore used in the same manner and to the same degree as when no independent circuit is used, and such independent generator and circuits may be used with fixed conductors along the hoistway (instead of cable conductors) and may be operated with either a constant current or constant potential in the circuits.

In the various diagrams in the drawings an elevator-car is shown suspended by a hoisting-rope, and the car in such case would commonly be operated in a well or hoistway provided with landings at the top and bottom and at intermediate points; but my system of electrical connections is adapted for an inclined hoistway, such as is used in mines, or for any other arrangement in which a movable car or platform is lifted by a rope, band, or chain connected with a stationary hoisting-machine.

Where a closed hoistway or well is used, doors are commonly employed to give access to the car when at the landings, and my invention provides means for locking such doors with electrical connections adapted to effect the following objects: first, to unlock the doors when the car is at the landing; secondly, to stop the car when it arrives at the landing; thirdly, to prevent the car from being moved so long as the door is open, and, fourthly, to start the car automatically as soon as the door is closed in the same direction that it was moving before its stoppage.

In private dwellings, where an attendant is not employed to operate the elevator, the car would be actuated chiefly by means of the landing-switches, and I provide an indicator or bell to be actuated by a branch circuit to show before the landing-switch is operated whether the car is already in motion.

In constructing such a system of electrical circuits and switches as is contemplated in my invention I arrange the circuits and switches with reference to the constant current or constant potential (that may be supplied from the electric generator) by observing two distinctions: first, that when the system is operated with a constant current the various landing-switches are connected in series; but when a constant potential is used said switches are connected in multiple arc, and, secondly, when the constant current is used the stoppage of the electrical hoisting apparatus is effected by short-circuiting, whereas when the constant potential is used the stoppage is effected by opening the circuit. Such variations in the construction and operation of the switches are required to maintain a passage for the current in one case, while in the other the electric generator in producing a constant-potential current is adapted to compensate automatically for the opening of the circuit at any point.

Describing my invention in connection with Fig. 1, an electric motor is shown connected by a belt $P^6$ with a hoisting-pulley $P^7$, and 7 and 8 are the positive and negative line-wires or connections to the generator. M are the coils of the motor-magnet; A, its armature; A′, its armature-shaft, employed to actuate the hoisting mechanism, and $A^2$ the commutator. The lines 1 2 3 4 represent conductors which would be fixed rigidly along the sides of the hoistway parallel with the movement of the car, and 12, 13, 14, and 15 are contact-pieces adapted to move along such conductors to convey the current to a switch S upon the car T. The conductors 1 2 are shown connected with the commutator-brushes B B′, and the conductor 3 is connected with one extremity of the field-coils. The negative line-wire 8 is shown connected with the conductor 4 at the end near the motor, and the positive line-wire 7 with the other extremity of the field-coils, the motor being shown wound in series, and the car-switch adapted to receive the current from such coils through the conductor 3, and to divert it at pleasure into either of the conductors 1 or 2, so as to reverse the motion of the armature and to lead it thence to the line-wire 8 by conductor 4. The car-switch and the electrical connections in the diagram are adapted for constant current. The car-switch requires two contacts receiving the current, respectively, from the field-coils and from one of the brushes, and two contacts for delivering it, respectively, to the other brush and to the negative line-wire.

The car-switch is shown upon a larger scale in Fig. 2, formed of two conducting-levers 33 and 34, arranged to bear when in their neutral or normal position upon a contact-strip 35, which operates to connect them electrically, and to thus form a short circuit between the conductors 3 and 4, to which such levers are connected by wires to the contacts 14 and 15. The strip 35 is connected to the contact 12 on conductor 1, and the levers are tied together by a non-conducting link $a$, so that both may be moved at once; and two contact-studs $20^a$ are arranged near the ends of the strip 35 and connected together and with the brush 13 upon the conductor 2. Such switch is adapted particularly to operate with constant current, with which it is necessary at all times to avoid an open circuit, and the levers are therefore made wide enough to touch both the strip and the stud when moved toward the latter. Supposing the switch-levers to be pushed toward the left to make the car go down, the course of the current through the various conductors would be, as indicated by the arrows $b$, from conductor 3 to contact 14, lever 33 and contact 12 to brush B, and from brush B′ to contact 13, lever 34, and contact 15 to the conductor 4 and line-wire 8. The current would thus pass through the armature in a given direction, as to make the car go down; and to cause its ascent the switch-lever would be pushed to the right, and the current would be reversed through the armature, as indicated by the arrows $c$.

Fig. 3 shows the pivot of the lever 33 extended through the side of the car and provided with an arm having a projecting pin $d$. Blocks $d′$ with inclined faces are shown in Figs. 1 and 3, fixed in the path of the pin at the extreme opposite ends of the car's travel and adapted to shift the pin (and with it both the switch-levers) to the central position shown in Fig. 1. When thus shifted, the motor-armature would be short-circuited by the connection of the conductors 3 and 4, and the car would therefore stop, and the relation of the incline to the pin $d$ would necessarily be such that when the car was thus stopped at either end of the route the switch could be shifted still farther to cause its movement away from such incline to travel over its path toward the other incline. A solenoid magnet-coil M′ is shown connected with the armature-circuit by a loop between the conductor 2 and the brush B′, and the core $M^2$ of the magnet is represented as connected with a brake-lever $P^2$. The lever is provided with a weight $P^3$ to press it normally upon a brake-wheel P′, which would be connected with the hoisting-pulley, and the magnet would operate, when energized by the current, to move the lever in opposition to the weight, and thus relieve the brake-wheel of the friction imposed by the lever.

With this construction the closing of the circuit through the armature, which is required to actuate the hoisting mechanism, operates positively to remove the friction of the brake, while the cutting off of the current from the armature-circuit automatically releases the brake-lever and permits it to press upon the brake-wheel P'. The hoisting-pulley is thus held securely when the motor is stopped independently of the motor-gearing, while it is automatically released from the pressure of the brake whenever the motor is started. Lines $L^2$ are drawn across the hoistway at intervals to represent the location of landings, and $e$ represent switches held normally open in branch circuits connecting the conductors 3 and 4 and adapted to be closed by a suitable connection to the landing-door when the latter is opened. The switch opposite the car is shown closed; but the doors are not shown in the diagram, as they would only obscure the electrical connections; but it is obvious that a door-switch may be operated by the door to short-circuit the motor when operating with constant current, and to thus prevent the car from being started until the landing-door is closed. Each door may also be provided with a locking device to secure the door normally shut, and provided with a solenoid L, which would be actuated by the automatic shifting of a switch $s$, when the car is moved to the landing in suitable position for the door to be opened. Such solenoid is shown in the diagram connected with a loop of the conductor 4 formed around a gap or break $s'$, and it would be necessary to keep the circuit through the solenoid-coils closed during the movement of the car to maintain a continuous current through the conductor. The switch $s$ is arranged to normally close the circuit around the solenoid and the door lock or bolt is actuated by a spring $t$ to normally lock the door, the car operating when it reaches the landing to open such switch and permit the current to pass through the solenoid-coils. The solenoid then operates in opposition to the spring to withdraw the bolt or locking device to permit the opening of the door. Between the lowest two landings a dotted outline $D^2$ is inserted to represent a door and the door-lock is represented as a bolt $D^3$, operating through the door-frame $D^{12}$ and formed with a sloping point and passed through a solenoid and adapted to engage a notch $D^3$ in the top of the door. The wires $s^2$, between which the switch $s$ is located, form a loop of the conductor 4 through the solenoid-coils and the switch is held normally open, as shown in the figure, until moved by a suitable connection to the car when it reaches the landing, as by rod $t'$. The door-locks are shown at two of the landings and are omitted from the others to avoid obscuring other parts. It is immaterial how the door-locks and door-switches for short-circuiting the motor are constructed, as their electrical connections and relations to the other electrical elements of the system do not form the subject of my present invention.

In Fig. 4 is shown a means of governing the hoisting mechanism by switches applied to the landings as well as to the moving car, the diagram showing connections adapted for use with constant potential, and the car-switch being connected with the operative circuit by contacts moving upon conductors fixed in the hoistway, as in Fig. 1. The motor, the conductors, the line-wires, the brake-magnet, the car, and the landings, are lettered the same as in Fig. 1; but the switches, being designed normally to open the circuit, are constructed differently. Each landing-switch is constructed with six contacts, two of which 19 and 20 are of segmental form, fixed at opposite sides of a central stud $f$, and connected, respectively, with the conductors 4 and 3. Upon the stud is pivoted an arm having at its opposite ends metallic springs $f'$ and $f^2$, bearing upon the segments and projecting beyond the same to reach the other four contacts. The arm is of non-conducting material, so that the springs serve merely to connect the contacts they touch. Adjacent to the segments upon one side of the arm when in its middle position are contacts 17 and 21, connected with the conductor 1, and upon the opposite side contacts 18 and 22, connected with the conductor 2. When the arm is in its middle position, as shown in the drawings, the springs touch only their respective segments and connect none of the contacts, and the outer contacts are so arranged that when the arm is turned to the right, as indicated by the arrow marked "right," the segment 20 may be connected with the contact 17, thus joining the conductors 4 and 1, the segment 19 being simultaneously connected with the contact 21 to connect the conductors 3 and 1, as per arrows $a'$. Supposing such movement of the current rotates the motor to cause the ascent of the car, then by turning the arm to the left the contacts 20 and 17 would connect the conductors 4 and 1 and the contacts 18 and 19 would connect the conductors 3 and 2 and cause the reversal of the motor to make the car descend. Adjacent to the contacts which are connected with the commutator-brush conductors are shown additional contacts $r'$, with intermediate resistances $r$, which form a connection with the segment 19 when the spring $f'$ is first moved from its normal position. Such resistances operate to prevent the entire current from entering the armature when the switch-arm is first moved, and thus avoid starting the motor too violently, while the gradual movement of the spring $f'$ past the resistances gradually increases the current through the armature until the maximum is attained. The motor is represented as series wound like that in Fig. 1, the current passing from the conductor 3 in all cases to the conductor 2 or 1 to actuate the motor, and from thence to the conductor 4 and the line-wire 8. The movement of the switch in either direction, as just described, therefore connects the conductor 3 with one of the commutator-brushes, and simultaneously connects the other brush with the negative line-wire, thus causing the rotation of the armature in reverse directions, according to the movement of the switch, while the placing of the arm in its normal or middle position opens the circuit and causes the stoppage of the motor. As the constant-potential circuit is not adapted to work without a suitable resistance, each switch is constructed to avoid short-circuiting the motor and is arranged, as already shown, so that when in its normal or middle position it will open the circuit by connecting none of the contacts. A similar switch is shown upon the car, with the springs upon the switch-arm similarly lettered, and the several segments and contacts are indicated by the same numbers as in the landing-switch, with a "prime" mark added thereto. The moving contact 12 upon the conductor 1 is represented, as in the landing-switch, connected with the switch-contacts 17′ and 21′. The moving contact 13 upon the conductor 2 is connected with the contacts 18′ and 22′. The moving contact 14 upon conductor 3 is connected with the segment 19′, and the moving contact 15 upon conductor 4 is connected with the segment 19′. The car-switch therefore operates in all respects like the landing-switch, and when connecting the segment 20′ with the contact 22′ (by the turning of the arm to the right) it causes the car to ascend, as before described, as per arrows $c'$. The diagram does not attempt to show the true position of the conductors with reference to the car or to the landing-switches, as it would obviously obscure the drawing to show an actual hoistway with suitable conductors arranged therein for the moving contacts, and with landing-switches located at the sides of the hoistway and suitably connected with the conductors. The diagram shows the electric circuits; and the relation of the car-switch to the landing-switches, when the car is at different points in its travel, may be readily determined by tracing the path of the current through the conductors, as is fully shown in the other figures, in which the switches are shown in various positions. Where a series of switches operate by a constant potential, there is a liability to short-circuit the motor when two switches are turned at once in opposite directions. I have shown in the other figures an electric bell as a means for indicating to an operator at any landing whether the car is already in motion and its switch therefore turned from its normal position, and when such indicator is used it is only through malice or carelessness that the landing-switch would be turned to produce such short circuit. To avoid the damage which might result to the dynamo which supplies the current in such a constant-potential circuit, in case a short circuit were produced, fusible plugs $f^3$ are inserted in the switch connections, as are shown in the connection between the segment 20 and the conductor 4 in Fig. 4. It is obvious that if the landing-switch should be turned in the same direction as the car-switch it would connect the same conductors and produce no short circuit; but if a car-switch is turned in one direction to connect the conductors 3 and 1 while the landing-switch were turned in the opposite direction to connect 1 and 4 a short circuit would result and the fusible plugs would be required, and such plugs would then by their melting open the circuit immediately.

Fig. 5 shows the connections for a constant-potential circuit with a shunt-wound motor and car and landing switches arranged in the circuit, the lower landing-switch being turned to the right as to go up and the car-switch turned to the left as to go down, as shown by the arrows marked "right" and "left." With a shunt-wound motor the current passes partly through the magnet-coils and thence to the negative line-wire, and the open circuit, which is produced by the switches, is formed only in the armature-circuit. The conductor 3 is therefore interrupted at each landing and the switches provided with an additional contact connected with the segment 19 by the spring $f'$, to normally close the circuit around the break 13 formed in such conductor. The series of landing-switches thus operate normally to maintain a circuit (through conductor 3) to the car-switch, but break the connection to the same when moved to actuate the motor. The breaks may be formed, as by a short overlapping of the adjacent parts of the conductor, so that the contacts 12, 13, 14, and 15 may move over them without obstruction, but lose the current from the previous section of the conductor when passed beyond the same. The first function of the landing-switch in actuating the motor is to shift the spring $f'$ to open the circuit around the break 13, and, second, to close the circuit from the conductor 1 to the conductor 2 or 3, as may be required, the spring $f^2$ simultaneously connecting one of the brush-conductors to conductor 4 and the negative line-wire 8. In a system with a shunt-wound motor the final terminal of the magnet-coils is connected with the conductor 4 and the current from both passes through the coils of the brake-magnet M′ to the line-wire 8. The arrows $d$ indicate the path of the current through the landing-switch to connect the conductors 3 and 1, while the arrows $d''$ show the passage of the current through the car-switch to connect the conductors 1 and 4. The current thus finds a course from 3 to 1 and 1 to 4 and produces a short circuit. The fusible plug $f^3$ is shown in the connection from the car-switch to the moving contact 14, instead of in the several connections from the conductor 1 to the contacts 20 in the landing-switches. When thus located it obviates the use of a number of separate plugs in the separate connections from the landing-switches to correct a short circuit through the car-switch.

The fuse may, however, be placed in any suitable location, as in the connections from conductor 3 to the segments 19 in Fig. 5. It will be noticed in reference to Fig. 5 that the motor will receive the current to move the car when both the car and landing switches are turned in the same direction; but when turned in opposite directions a short circuit will result and the car will not be moved, but the fuse will be melted. Although such fuse may be readily replaced, its melting is wholly unnecessary with the use of the indicator described herein, and it is only inserted in the connections as a safeguard against carelessness. The indicator is shown in connection with a system for constant current shown in Fig. 6. In this construction the similar parts are lettered the same as in Figs. 1 and 4, with the conductors 1 2 3 4 similarly arranged, and a branch circuit around the armature being formed by wires 5 and 6, connected, respectively, with the conductors 1 and 2. At each landing an electric bell $k^2$ is shown actuated by an electro-magnet $k^3$, which is placed in circuit with the wires 5 and 6 by the closing of a switch $k^4$. The switch is held normally open, and is closed when the operator desires to learn if the car is in motion, the magnetic bell being then actuated by the difference of potential in the conductors 1 and 2. When the motor is not in operation, the counter electro-motive force of the armature is nothing; but when the motor is in operation the counter electro-motive force is developed to a sufficient degree to establish a branch circuit from the conductors 1 and 2 through the wires 5 and 6 and to actuate the bell in the desired manner. By pressing an ordinary switch-button an operator at the landing may thus easily ascertain whether the motor or car is in motion. It is obvious that an annunciator of any kind, or other indicator giving notice to the eye instead of the ear, may be substituted for the bell. The motor is shown series wound with the line-wire 7 connected with one terminal of the field and circuits interposed between the other terminal of the field and the armature and between the armature and the other terminal of the line. The car and landing switches are provided with contacts to close these circuits through the armature in reverse directions; but provision is required in a constant-current circuit to keep the circuit always closed. The several switches are arranged in series and provided with contacts in such proximity as to maintain the circuit while the switch is moved from one contact to another. Breaks 30 are shown in the conductor 3 and breaks 31 in the conductor 4, and the landing-switches are provided with contacts normally connected to maintain the circuit around such breaks, the current being thus conducted from one switch to another along the broken conductor so long as the landing-switches remain unmoved. In Fig. 6 the car T is shown in two locations in the hoistway to illustrate the operation of the circuits when in such positions, and with landing-switches U, shown at the landings not occupied in the diagram by the car. In practice all the landings could be furnished with switches to operate the same as those shown. The car-switch is shown the same as in Fig. 1, with the moving contacts likewise arranged; but the landing-switches U are shown with two arms at right angles to one another, carrying four independent springs which operate upon four segments to connect them with adjacent contacts. As no resistances are required, the movement of the switch is quite small, and the contacts are placed in such relation to one another that the springs may form a new connection without making an open circuit. The car-switch operates normally to short-circuit the motor by conveying the current from conductor 3 to 4, as in Fig. 1, and the function of the landing-switch in actuating the motor is first to break this short circuit and next to complete a circuit through the armature. In all the diagrams the motor is shown at the top of the hoistway to make its relations to the switches more clear; but it is obvious that it may be located in any position and at any distance from the hoistway, as may be required to operate the hoisting mechanism. However it is located, the conductors 1, 2, 3, and 4 would preferably be connected at one end only to the line-wires or motor, and the switch nearest to such connected ends would, obviously, if there were a break in one of the conductors, receive the current in advance of any other switch. The conductors are shown thus connected at their top ends, and the top switch in each diagram would therefore receive the current from the broken conductor and would operate either to transmit it to those beyond or to divert it into the motor to actuate the same. The movement of the car past any such break would thus wholly deprive it of the current, except when a circuit were closed around the break by the landing-switch. The landing-switches shown in Figs. 5 and 6 operate thus to normally close the circuit around the break and to thus convey the current past the break to the car-switch, whatever its position in the hoistway. Any landing-switch, however, between the car and the tops of the conductors (the ends connected with the circuit) would operate to cut off the current from the car-switch when moved from its normal position, while those beyond the car-switch would have no effect upon such switch. In the landing-switches the four segments are numbered 39, 40, 41, and 42. The springs resting thereon are numbered 26, 27, 28, and 29, and contact-stud 45 is connected normally with the spring 26 and permanently with the conductor 3, the segment 40 being permanently connected with the same conductor upon the opposite side of a break 30. The contact-stud 46 is connected normally with the spring 27, and permanently with the conductor 4, the segment 41 being permanently connected with the same conductor upon the opposite side of a break 31. The segment 42 is permanently connected with the conductor 2. The segment 39 is connected normally with the spring 29 and permanently with the conductor 1. By the side of the segment 42, connected with conductor 2, are studs 47 and 49, connected, respectively, with the conductors 4 and 3, and by the side of the segment 39, connected with conductor 1, are the studs 43 and 44, connected, respectively, with the conductors 3 and 4.

Fig. 6 shows the switches all in their normal position, the current passing from the conductor 3 into the spring 26 and back through the segment 40 to the same conductor beyond the break 30, and then traversing the said conductor to the moving contact 14, from which it passes through the car-switch to the moving contact 15, and through the conductor 4 to the line-wire 8. The car-switch thus operates normally to short-circuit the motor so long as the landing-switches are unmoved, whatever its position, as may be seen by tracing the arrows $e$ in Fig. 6, to the car-switch in both of the cars represented in such figure.

Fig. 7 shows a similar diagram with the car in the middle of the hoistway, its switch in its normal position, and the lowest landing-switch turned to bring the car down to such landing. Such movement turns the spring 27 away from the contact 46 and thus opens the short circuit around the break in the conductor 4, the spring 26 at the same time being shifted from the contact 45 to open the short circuit around the break in the conductor 3. The spring 29 at the same time connects stud 43 (which is united to conductor 3) with the segment 39 and conductor 1 to lead the current from conductor 3 to the armature, the shifting of the spring 28 at the same time connecting the stud 47 (which is united to conductor 4) with the segment 42 to receive the current from the armature through the conductor 2 and lead it to conductor 4. The current after passing, as shown by the arrows $f^3$, around the break 30 in the conductor 3 through the two upper landing-switches is unable to find a short circuit through the car-switch, as the connection from the car-switch to the negative line-wire 8 is cut off by the movement of the spring 27 in the lowest landing-switch. No current, therefore, passes through the car-switch, and the motion of the motor is wholly controlled by the movement of the lower landing-switch. By turning the lower landing-switch the car may thus, whatever its situation in the hoistway, be brought down to the lower landing for the use of any one at that point.

Fig. 8 shows a similar diagram with the car-switch in its normal position and the upper landing-switch turned to bring the car up. The movement of this switch operates to wholly cut off the current from the conductors beyond the same, the short circuit through the car-switch being broken by the movement of the springs 26 and 27, and the current passing, as shown by the arrows $g$, through the spring 28 to one of the armature-brushes, and from the other to the spring 29, and to the conductor 4 and line-wire 8. From the above illustrations it will be seen that any person upon a landing above the car may operate the landing-switch so as to bring the car up, or by a landing-switch below the car may cause it to move down; and it will be also noticed, by tracing the path of the current in the various positions of the switches, that the landing-switch not only connects the various contacts therein to send the current through the motor-armature in the right direction, but it also opens the circuit through the car-switch by destroying the continuity in the loop around the break in the attached conductor. Such an effect upon the car-switch can only be produced with constant current, in which case the car-switch may be permitted to short-circuit the motor; but in a system using constant potential, as shown in Fig. 4, it would not be permissible to short-circuit the motor through any of the switches, and the car-switch is therefore held normally open, the same as the landing-switches shown in that figure. In cases where an operator is not employed to constantly attend the elevator-car, it is obvious that persons on different landings may desire to use the car at the same time, or may attempt to control the current by the use of the landing-switch when the car is in motion and its switch shifted. One of the objects of this invention is to furnish an electric-elevator system adapted to reconcile, as far as possible, the requirements for such a situation, and to avoid short-circuiting with constant potential or an open circuit with constant current. It is also especially adapted to prevent any injury to the several parts of the system from the contrary working of the switches, by accident or by different persons operating at the landing and in the car at the same time. A circuit operated by constant current is especially adapted to effect these objects, and has been specifically claimed herein, although my generic claim is intended to cover a system adapted for both kinds of current. In a system operated with constant current broken conductors may be used, and the switch above the car, whether it is at rest or in motion, will operate, as just stated, to wholly cut off the current from the car-switch, and to therefore exclusively control its movement. The broken conductor below such landing-switch becomes practically dead, and thereby destroys one of the connections necessary to the operation of the car-switch. I do not, however, limit myself to the use of broken conductors in cases where car and landing switches are both required, as the switches may be operated without such continuous conductor although not with the same convenience. If the continuity of some conductor connected with a landing-switch (in the system with constant current) were not broken, any landing-switch beyond the car-switch would not operate when the car-switch was in its normal position, as the car-switch then short-circuits the motor; but the breaking of the circuit through the conductor, in a loop thereof, by means of the landing-switch, when shifted to operate the motor, destroys the short circuit through the car-switch, and enables the landing-switch to control the current. The number of discontinuous conductors employed to operate a car-switch and landing-switch in the same circuit is not material, as the construction may be varied with the winding of the motor and the class of current employed; nor is it material which of said conductors is broken, the conductor 1 being shown with breaks 13, in Fig. 5, and the conductors 3 and 4 being shown discontinuous in Fig. 7.

The diagram in Fig 9 is drawn to illustrate the effect when all the switches are moved at once into an operative position; the arrows marked $a^2, b^2, c^2, d^2, e^2, f^4, g', h', i, j, k^6,$ and $l^{10}$ show the path of the current to conductors 3 and 4, the current passing through the armature from conductor 2 to 1 and then branching off at different points into the paths formed by the various switches. The effects shown are produced in a system operating by constant current, but when operating by constant potential there is a liability to short-circuit the current, as shown in connection with Fig. 4, and the safety-plugs are therefore required to prevent damage to the dynamo furnishing the current.

The diagram in Fig. 10 is drawn to illustrate the construction for a system with constant current when landing-switches alone are used. Such a construction would be most suitable for freight-elevators, where no regular attendant would be employed to attend the car; but it would have to be brought to and dispatched from the different landings by the use of switches thereat. In such case it would be possible to secure the stoppage of the car at any particular landing by providing a landing-door and a door-switch thereat, or a switch analogous to the door-switch arranged to be operated by hand at such landing, so that the car when dispatched from any other landing would stop thereat. In such a system it would also be very important to provide an automatic stop at each end of the course to prevent the fouling or breakage of the suspending-rope. It will be noticed that the dogs $d'$ and switch-stud $d$ (shown in Fig. 1) would not operate to stop the car if it were moving under the control of the landing-switch, as the only function of the dogs is to throw the car-switch into a neutral position, and such neutral position is the normal position in which it is controlled by the landing-switches. Where landing-switches are used it is therefore necessary to provide means independent of the car-switch or any dogs for shifting the same to stop the car positively at the top and bottom of the hoistway. I have shown herein switches adapted to be shifted or actuated by a projection upon the car when the latter reaches the proper limits of its travel. Such switches are shown in Fig. 6 at $y\ y'$, the switches being inserted in branches between the line-wires 7 and 8, so as to short-circuit the motor when closed. The switches are held normally open by springs $y^2$, and are provided each with an arm $y^3$, having a stud or pin $y^4$, projecting in the path of a wedge $y^5$, attached to the moving car. The switch is so located that when the car reaches the desired limit of its travel the wedge operates to shift the switch and to stop the motor, thus preventing any accidents if the car is not properly governed by the operator. The short circuit thus formed cuts out all the car and landing switches, and means must therefore be provided for reopening the circuit through such switches before the motor can be started to move the car from its position. Such means would consist in a spring-closed switch adapted to open the short circuit formed by either of the switches $y\ y'$, and located upon the landing, where it could be held open by the operator until the car could be moved from its contact with the switch $y$ or $y'$. Such spring-closed switches are indicated at $x\ x'$, adjacent to the switches $y\ y'$, and a mere push-button would be used in practice, and would be arranged to normally close the circuit just as the switches $y\ y'$ operate normally to open it. Stop-switches operated in a similar manner are shown in Fig. 10 at $y^{41}$ and $y^{51}$, each switch consisting of two spring-leaves connected, respectively, with the conductors 7 and 8, and joined electrically, when the car reaches the limit of its travel at either end of the hoistway, by a metallic plate $y^6$ upon the car T. In Fig. 4 a similar plate $c^{10}$ and springs $c^{11}$ are connected with the locking-magnet L. The switches $x\ x'$ are in Fig. 10 shown applied to breaks in the conductor 8, the switches being shown closed and provided each with a push-button adapted to open it when required. These switches may be located at $x^3$ in a loop of the line 8. These stop-switches $y$, $y'$, $y^{41}$, and $y^{51}$ may be used to stop the car automatically at the ends of the hoistway in place of the means shown in Figs. 1 and 3 for shifting the lever of the car-switch. A freight-elevator, such as is shown in Fig. 10, may also be started at any landing and automatically stopped at an intermediate point by means of door-switches at the landings operated by opening the doors, as just described above. In Fig. 10 three landing-switches are shown adapted to operate by constant current, each being constructed with three springs attached to the switch arm or lever and bearing upon three separate segments. Such landing-switches would be connected merely by wires, and no conductors would require to be fixed in the hoistway. I have, however, numbered the wires the same as the constant-current conductors shown in Fig. 6. The segment $l$ in the switch nearest the motor is connected to conductor 3, the segment $m$ is connected with the conductor 1 from the brush B′, and the segment $n$ with the conductor 2 from the brush B. The switches are shown arranged to be normally connected in series by a spring $o$, bearing upon the segment $l$ and upon a stud $l'$, adjacent to the segment and connected by a wire $l^2$ with the similar segment of the succeeding switch, the segment of the last switch in the series being connected by wire $l^3$ with line-wire 8. Adjacent contact-studs $m'$ and $n'$ are connected with segments $m$ and $n$ and adapted to throw the current from the segment $l$ and spring $o$ into the conductors 1 and 2, respectively, when the spring is moved to such studs. Springs $r$ and $s$ bear, respectively, upon the segments $m$ and $n$, and contacts $r'$ and $s'$ are arranged adjacent to the same and connected, respectively, with the conductors 1 and 2, the springs operating normally to close loops or breaks formed in each of the said conductors, but adapted when moved to connect either of said conductors with the stud $l'$ and with the wire $l^2$ and negative line-wire 8. The upper switch is shown in its normal position. The center switch, arranged below it, is turned to the right, and the lower switch is shown in full lines in its normal position in dotted lines turned to the right, and in wavy lines turned to the left. Between the segments $m$ and $n$ are shown contacts $b^6$, in line with the space between the segments $r'$ and $s'$, and connected with the same when the switch-arm is moved into an operative position to move the car up or down. The contact $b^6$ of each switch is connected by wire $a^6$ with the contact $l'$ of the switch below, and operates, when more than one of the switches is by accident turned at the same time, to maintain a path for the current to the positive and negative line-wires to prevent a break in the circuit. Such break would be very injurious with a constant-current circuit, and would otherwise occur under such circumstances, as will be seen by following the arrows in dotted and wavy lines which are applied to the drawings. When the center switch is turned from its normal position, as shown, the current passes from such switch by the black arrows to the armature-brush B, and from the armature-brush B′ back to the contact $m$ in the center switch, from which it passes through the stud $l'$ and connection $l^2$ to the segment $l$ of the lower switch. From this segment, if the lower switch were in its normal position, the current would pass to the stud $l'$ and through the connection $l^3$ to the negative line-wire 8. It will be seen by inspecting the center switch that the current returning to the switch from the armature passes from the segment $m$ or $n$ (according to the position of the switch-arm) to the stud $l'$ by a connection $c^6$, and if the lower switch receive the current from the armature the current would enter segment $m$ or $n$ and pass thence to the stud $n'$ or $m'$, and through the spring $o$ into the stud $l'$ to reach the line-wire 8; but when the lower switch, or the one farthest from the motor, (and which forms normally the connection for all the other switches to the line-wire,) is displaced simultaneously with any other switch in the series its spring $o$ is disconnected from the stud $l'$ and line-wire, and other means are required in each of the other switches to form such connection. Such means are provided in the wire $a^6$, which connects the stud $b^6$ with the contact $l'$ of the switch below it in the series. When the lower switch is moved to the position shown in dotted lines, the current would be compelled to follow the course indicated by the dotted arrows to contact $s'$ of the switch above it, and would be there connected by the spring $r$ or $s$ (according to the position of the switch-arm) with the contact $b^6$, from which it could pass by the wire $a^6$ to the contact $l'$ of the switch below it, and thence through conductor $l^3$ to the line-wire 8. The same results follow when the lower switch is moved to the position shown in wavy lines, the wavy arrows showing the current led to the contact $r'$ of the switch above it, and thence through the stud $b^6$ and wire $a^6$ to the negative line-wire, as before. With this construction when the center switch, or one nearer to the motor, is operated to actuate the motor, the moving of a lower switch in the series does not prevent the switch in advance of it in the series from operating in the intended manner, nor does it prevent the current from such earlier switch from reaching the negative line-wire, as is required. The path traversed by the current, as indicated by the dotted and wavy arrows, is simply the path that the current is required to follow after leaving the center or earlier switch. It is obvious that the switch nearest the motor would receive the current from the conductor 3, and would affect the operation of the motor to the exclusion of any other switch in the series which might be turned at the same time. It will be seen that with switches thus constructed, and automatic stop-switches at the ends of the hoistway, my construction is completely adapted to prevent the derangement or interruption of the circuit, or the stoppage of any other apparatus connected in series therewith, and is so designed that it may be operated by any persons who would be trusted with the management of any form of power-elevator.

The system shown in Fig. 10 is adapted for dumb-waiters or hoisting-apparatus of any kind actuated from stationary landings, and when such switches are operated singly each one is capable of controlling the car at any part of its course, owing to the absence of a car-switch, which, as has been described above, operates to cut out the landing-switches when situated between any of the same and the motor connections.

Fig. 11 shows an arrangement with circuits and switches for actuating the car by hydraulic mechanism through the agency of an electric motor, the motor shown being of the reversible type and connected with a reversible rotary pump. The movement of the car in this construction is as much dependent upon the movement of the motor, and therefore upon the switches used to change the circuit connections, as in any other of the systems heretofore illustrated.

In Fig. 11, M is the electric motor, shunt wound; $P^{12}$, the rotary pump; $P^{13}$, a water-reservoir with weighted plunger $P^4$, and $P^5$ a cylinder having a piston-rod $P^6$ and pulley $P^7$ to actuate the rope $L^4$ for the car $L^5$. The pump operates, according to the direction of its motion, either to draw the water from the reservoir and force it into one end of the cylinder to pull the rope and hoist the car, or to draw the water from the same end of the cylinder into which it was forced, and deliver it back into the reservoir under the pressure of the plunger $P^4$ to lower the car. The plunger is weighted to such pressure as to overbalance the empty car, and to thus furnish to the pump a current of fluid under suitable pressure to materially assist in elevating the load. The work thrown upon the motor when lifting is thus greatly diminished, and some of the work is imposed upon it when lowering the car. The switches are shown for a constant-potential circuit, the switch-lever $M^4$ upon the car being formed of non-conducting material, with metallic plates $m^6$ and $m^7$, and the switch being formed with three sets of segments, lettered, respectively, $n^6$ connected with the conductor 4, $n^7$ connected with the conductor 2, and $n^8$ connected with the conductor 1, and with two sets of resistances $n^9$ connected with the conductor 3. The conductors are shown as if fixed stationary in the hoistway and the connections for it made by moving contacts 1′ 2′ 3′ 4′. The conductors 1 and 2 are connected with the commutator-brushes, and the conductors 3 and 4 are connected primarily with the positive and negative line-wires and with the opposite terminals of the field-coils. The car-switch operates when moved from its normal position to the right to throw a portion of the current from conductor 3 into the conductor 1, and thence through the armature into conductor 2, and through segments $n^7$ and $n^6$ into conductor 4 to the negative line. When moved in the opposite direction, the current passes from the conductor 3 to conductor 2, and thence through the armature to conductor 1 and 4, thus reversing the motion of the armature and of the pump in the desired manner. The landing-switch is provided with lever $O^6$, having a metallic plate $o^7$ near one end fitted to connect, respectively, segments $o^{10}$ with resistances $n^{10}$ and segments $o^{11}$ with the resistances $n^{11}$, a plate or spring $o^8$ at the opposite end of the lever being adapted to bear upon the segment opposite that in contact with the plate $o^7$. The resistances are all connected with conductor 1, the segment $o^{11}$ with the conductor 3, the segment $o^{10}$ with the conductor 4, and the plate $o^8$ with the conductor 2, and the lever operates when shifted to the right and left to effect the same changes in the circuit as the lever of the car-switch.

Hydraulic mechanism for operating elevator-cars is already so widely used in so many modifications that it is obviously immaterial what kind be employed in my electric system to produce the motion of the car, provided the motion of the hydraulic hoisting apparatus be controlled by electric circuits and switches in the manner shown in any of my different drawings, or described herein. I have merely shown the construction in Fig. 11 to illustrate one form of my invention, and it is immaterial whether a reversible pump be used or whether the electric motor and pump be employed merely to elevate the car, and the descent of the same be secured by discharging the water from the hydraulic cylinder, or whether the hydraulic mechanism be actuated by a water-motor and the movements of the motor controlled by a magnetic switch and electric circuits, as shown in Fig. 14.

Fig. 12 shows the application of my invention to electric circuits and switches, in combination with a motor running constantly in one direction and connected with a hoisting-drum by a belt or belts which require to be shifted to and from the fast pulley which drives the elevator. In such case my system of circuits and switches is employed to actuate an electro-magnetic shifter to act upon the elevator-belt and to move the same to and from the fast pulley. In the drawings only the armature $A^5$ of the motor is indicated with the bed $M^5$ for the entire motor and the binding-posts $p^5$, which receive the current from the segments of a hand-switch interposed in the positive line-wire which is connected with one of the terminals of the field. $C^6$ is a counter-shaft driven continuously by the motor, and $B^5$ and $B^6$ are straight and cross belts driven by the counter-shaft and shown resting upon loose pulleys $B^7$ on the elevator-driving shaft $B^8$. A fast pulley $B^9$ is shown upon the shaft between the pulleys $B^7$, and a shifter $B^{10}$ is shown applied to both the belts and operates, when moving one of the belts upon such fast pulley, to move the other away from it upon the adjacent loose pulley. The shifting device consists of an electro magnet or magnets $M^6$, with opposite poles N S, arranged at a suitable distance to admit between their pole-pieces N S a rotary electro-magnet $M^8$, which is held normally with its poles at right angles to the poles of the magnets $M^6$ by an arm $A^6$ and weight $W^6$, the coils of the armature being then at right angles to the coils of the magnets $M^6$. As shown in the drawings, the current, when the lever $s^7$ of the hand-switch connects the segments $s^5$ and $s^6$, passes from the line to the motor and from the motor to one terminal of the coils around the magnets M⁶, but passes only through the rotary magnet or armature M⁸, when the current is directed through the same by circuits and switches arranged according to my system. In this Fig. 12, C⁷ is the car, and 1 2 3 4 conductors arranged in the hoistway, with sliding contacts 1½, 2½, 3½, and 4½ connected with a switch upon the car. The switch is provided with four segments, s⁸ connected with conductor 1, s⁹ connected with conductor 2, s¹⁰ connected with conductor 3, and s¹¹ connected with conductor 4, and with a lever $l^8$, carrying two curved springs, insulated from one another and adapted each to bear upon three of the segments when in their neutral position, as shown in the figure, but to unite only two of such segments when moved into an operative position in either direction. The switch is thus adapted for constant current, as it avoids opening the circuit in either direction, while it operates, like the car-switch shown in Fig. 1, to throw the current from conductor 3 alternately into conductors 1 and 2 to reverse the current in the circuit, and to thus actuate the hoisting mechanism in contrary directions, as desired. When the top of the car-switch lever is turned to the left, as per arrow marked "left," the current passes, as indicated by the arrows $l^9$, from conductor 3 into conductor 1, which is connected flexibly with one terminal of the coil about the rotary armature M⁸, and from the other terminal of such coil to the conductor 2, and through the switch-segments $s^9$ and $s^{11}$ into conductor 4. The movement of the lever $l^8$ in the opposite direction diverts the current through the armature M⁸ in the opposite direction. The poles of the fixed magnet are indicated by the usual signs N S;
but as the rotary armature is very nearly circular in cross-section but very slight rotary tendency is produced by the attraction of such poles until the circuit through the armature is closed. When the armature becomes magnetized with poles at right angles to the poles N S, there is a strong tendency to rotate in the effort of the currents around the armature to place themselves at right angles to the lines of force in the field between the poles N S. The armature lever or arm A⁶ is connected with the belt-shifter B¹⁰, and the motion of the armature in one direction is utilized to throw the straight belt upon the elevator-driving pulley B⁹, and to thus hoist the car, while the reversal of the current in the armature and its movement in the opposite direction is utilized to push the straight belt off the fast pulley and to move the crossed belt thereon to run the car down. Only the car-switch is shown in Fig. 12, as in Fig. 1; but landing-switches alone may be used, if required, as in Fig. 10, or the entire system, with car and landing switches, door-switches, door-locks, and automatic stop mechanisms shown herein may be connected with the circuit and operated as described herein. It is obviously immaterial whether the reversible current be directed through the coils of the rotary armature or through the coils of the fixed magnet or magnets to effect the desired movement in the armature lever or arm A⁶, and it is obviously immaterial whether an arm be used to actuate the belt-shifting mechanism or a rack and pinion or other equivalent mechanism be employed.

Fig. 13 shows the arrangement of currents and switches for a constant-current system, in which a flexible conductor or cable is used to convey the current to the car. The motor is series wound with the coils of the solenoid-brake magnet M' in a circuit passing from one of the armature-brushes to the wire 13', connecting with the car and landing switches. The conductors 1 and 2 are merely insulated wires connected with the opposite armature-brushes. The conductor 3 is connected with the negative terminal of the motor field-coils and the conductor 4 with the negative line-wire. Lines L² represent landings at different heights in the building, with landing switches applied to the first and third landings and the car shown situated at the level of the second landing. The car-switch is the same as that shown in Fig. 1, (a constant-current system,) but the landing-switches are constructed with merely two segments K and K', connected, respectively, with conductors 2 and 1 and having a contact $v$ connected with wire 12', leading through the flexible cable to the contact 35 of the car-switch and connected normally with conductor 1. Adjacent to each of the segments is a contact $q$, connected with the conductor 4, and thus with the line 8, and a contact $q'$, connected with the conductor 3, and through wire 14' with the lever 33 in the car-switch. The landing-switches, when their levers provided with the contact-springs K⁷ and K⁸ are turned to the right and operated independently of the car-switch, thus serve to connect the conductors 3 and 2 to throw the current into the brush B' and at the same time to connect the conductor 1 and brush B with the conductor 4 and line 8. When turned to the left, the arms of the landing-switches connect the conductor 3 with conductor 1, and also connect the brush B' with the conductor 4 and the line 8. The parts lettered 33, 34, 35, and 20 in the car-switch are connected, as in Fig. 1, with the conductors 3, 4, 1, and 2 by means of the wires 14', 15', 12', and 13'. Assuming that the car-switch be turned to the left to run the car down, the current then passes through the cable from the field-terminals by wire 14' to the lever 33, thence through wire 12' to contact $v$ and spring $k^8$ of the landing-switch, and through contact K' to conductor 1 and brush B. After passing through the armature the current passes from the brush B' and brake-magnet M' by the wire 13' through the cable to the contact 20 and lever 34. It then returns through the cable by wire 15' to the conductor 4 and line 8. When the car-switch is turned in the opposite direction, the current in the motor is reversed and the same effects produced as by the car-switch shown in Fig. 1. The landing-switches are shown connected mechanically by bell-crank $u$ and a link $u'$ to secure the opening of the circuit at all of the contacts $v$ when any one of the landing-switches is operated.

The car-switch will operate in connection with a landing-switch with the construction shown if only one landing-switch is used; but if more than one be connected with the circuits, as shown in the figure, the movement of any one of the landing-switches will not suffice to control the current, as it is necessary in such case that the circuit through the car-switch should be broken. This is effected in each landing-switch by moving the spring $k^8$ from the contact $v$; but the movement of one of a series of landing-switches will not suffice to open the circuit through the car-switch unless the others be moved at the same time, for which purpose the bell-cranks $u$ and link $u'$ are shown. In lieu of such mechanism for operating all the landing-switches at once the landing-switches may all be connected in series, as is indicated by the wavy line $v'$, connecting the contact $v$ in one switch with the spring $k^8$ in the switch below it. With this construction the circuit to the car-switch passes through contact $v$ of each switch to the spring $k^8$ of the switch below it, and the circuit may thus be completed through any number of landing-switches. The movement of any one of the landing-switches will therefore open the circuit through the car-switch, and the current will follow the path through the particular landing-switch that is moved. The wires 5 and 6, connected, respectively, with the brushes $B'$ and $B$, are provided for the connection of indicators $k$ at the landings, such as are shown in connection with the same wires in Fig. 6.

In all the systems shown in Figs. 1 to 13 the same current that passes through the motor-armature is conveyed by the circuits to the various operative switches in the car or at the landings. While this arrangement is most simple, it is obvious that as my system consists in the combination of circuits and switches such combination may operate with an independent electrical generator, and that the current operating in the circuit from such independent generator may be employed to actuate a reversing-switch placed in the motor-circuit, and thus control the operations of the hoisting mechanism actuated by the motor. Such a construction is shown in Fig. 14, the conductors being shown at 1, 2, 3, 4, 7, and 8, the car-switch connected with the conductors by a cable, and the independent generator $G^3$ being connected with the switch upon the car and with a landing-switch connected with the conductors 1 2 3 4. M is the magnet of the motor, which is shunt-wound and with a circuit and motor-switch Z, adapted to a constant-potential system. The current is shunted through the field from the +line-wire 7 by wires $a^{11}$ and $a^{12}$ and through the motor-switch Z by wires $b^{10}$ and $b^{15}$, which are connected, respectively, with segments 19 and 20 in the switch Z, which is constructed and operated the same as the switch shown in Figs. 4 and 5. The switch-lever carrying the contact-pieces or springs $f'$ and $f^2$ is shifted by a link $f^{10}$, which is actuated by an electro-magnetic shifter (indicated by the letter Y in Fig. 14, and shown in detail in Figs. 15, 16, and 17.) In the latter figures, E E are the poles of a stationary magnet; F F, the poles of a movable magnet pivoted to turn in relation to E E and normally held at right angles to the same by a weight W. This electro-magnetic shifter operates electrically the same as the one shown in Fig. 12, but mechanically is of different construction, as it is provided with brushes resting upon movable contact-pieces to convey the current to the cores of the movable magnet from the independent generator $G^3$, and the magnet and armature cores being formed in pairs connected by bridges. The current passes from the independent generator $G^3$ by the wire $e$ to the coils of one pole E, and from thence by wire $e'$ to the coils of the other pole E, as shown in Fig. 15, and from thence by wire $f^{21}$ to the conductor 2. The conductors 1 and 3 are connected, respectively, by the wires $f^{12}$ and $f^{11}$, with the brushes $g^{10}$ and $g^{11}$, resting upon the segments $h^{10}$ and $h^{11}$, which are in electrical connection with the coils of the movable magnet-poles F. The conductor 4 is connected with the wire $f^{14}$ of the generator $G^3$.

The car and landing switches shown at X and X' are similar to the switch Z and to the constant-potential switches in Figs. 4 and 5, and have their several contacts lettered the same as in Figs. 4 and 5 and connected with the same conductors. The movement of the switch X or X' operates to vary the current in the circuits through the brushes $g^{10}$ and $g^{11}$ the same as the switches connected with the armature-brushes B and B' in Figs. 1 to 13, inclusive, and the current around the movable magnet-poles F is therefore reversed at pleasure, with the effect of reversing the polarity of such poles and causing them to be forcibly attracted or repelled by the poles of the fixed magnet E E. As shown in Figs. 15 and 16, the bridge of the poles F is formed with extensions at opposite sides to carry upon the one hand the weight W and upon the other hand the link $f^{10}$, by which the motion of such bridge (when the poles F are retracted or repelled) is transmitted to the operative arm of the motor-switch Z. By such connection between the electro-magnetic shifter and the motor-switch the latter is moved at the same time in the same direction with either of the switches X or X', and thus varies the current in the motor-circuit the same as if such circuit were connected directly with the car or landing-switch. It is obviously immaterial how the electro-magnetic shifter be caused to operate upon the motor-switch; but it will be readily understood that the axis $x^3$ of the switch Y might be in practice made coincident with the axis $x^4$ of the switch Z by mounting the magnet F upon the same stud that carries the arm of the switch Z. In such case it would not be necessary to employ a link, as $f^{10}$; but the arm of the switch Z could be connected directly to the bridge of the magnet-poles F.

It is obvious that in the system shown in Fig. 14 the car-switch may be connected with the electric circuit by sliding or rolling contacts moving over fixed conductors in the hoistway, as in Figs. 1 to 9, inclusive, the circuits being conducted to the car by a cable in Fig. 14 merely to show the connection of a constant-potential circuit with the car-switch equivalent to the arrangement of the constant-current circuits shown connected with the car by a cable in Fig. 13.

In Fig. 5 door-switches $e^3$ are shown formed in a loop of the conductor 4, the ends of the loop being connected with the conductor at each side of a break $e^4$, formed in the said conductor above the path of the sliding contact 15. As such figure shows circuits adapted for constant potential, such door-switches would be held normally closed, and may be actuated by any suitable connection to the door to open the circuit, and to thus prevent the actuation of the motor until the door is closed.

In Fig. 10 switches are shown in a loop of the −line-wire 8, which would be held normally closed, as by a spring push-button, and which may be used instead of the switches $x\ x'$.

In Fig. 13, in addition to the shifting-blocks $d'$ for automatically shifting the switch-lever 33 upon the car at the end of its travel, the stop-switches $y\ y'$ are shown arranged similarly to those in Fig. 6, and could be used to stop the car in place of the means for shifting the car-switch automatically, if desired. In such case they would be held normally open and operated by wedges $y^5$ upon the car, as shown in Fig. 6.

In Fig. 13 door-switches $e^6$ held normally open are shown in a branch circuit between the line-wires 7 and 8, the one on a level with the car T being shown closed, as would be the case if actuated by a connection to the open door when the car was stationed at the landing to short-circuit the motor. The same switches upon the first and third landings are shown open, as would be normally the case so long as the doors at such landings were closed. When landing-switches are not used, as in Fig. 1, the door-switches may be connected with the same conductors upon which the sliding contacts of the car are arranged to move, the connections for such switches being attached at each landing, so that the opening of the door-switch may cut off the current from such contacts and the car-switch connected therewith. When landing-switches are used, the connections thereto will cut out the door-switches which may be located beyond them, and thereby render them inoperative, and the arrangement shown in Fig. 18 may, if desired, be used, consisting in a single switch $e^6$, connected with a branch of the main circuit above the highest landing-switch and actuated by mechanism as the wire or rod $e^7$ and cranks $e^8$, located at the separate landings. Rods $e^{12}$ receive the thrust of the door, and springs $e^{13}$ press rods toward door. Separate door-switches may also be used, as shown in Fig. 13, arranged at the different landings, but located in a loop of the − line 8, so that they are wholly removed from the variations in the current which are effected by the landing and car switches upon the conductors with which they are connected.

The car T in many of the diagrams is shown without any hoisting-rope or means of connection to the hoisting apparatus; but in other cases, as in Fig. 10, a mere suspension of the car from a drum is indicated, and a belt connection from the drum to a pulley upon the motor-armature shaft.

In Figs. 4 and 11 various means are shown for transmitting the motion of the electric motor to the car, and it is obvious that in those cases where the connection of the motor with the car is omitted it may be readily supplied by any of the means that are shown or any other suitable hoisting mechanism. The brake-magnet M' is also shown in most of the diagrams applied to a brake-wheel P', and it will be understood that such application may be made at any point in the hoisting mechanism where it will be most convenient or effective.

It will be understood that in the diagrams the brake is pressed normally against the brake-wheel, as by the weight $P^3$, and thus tends to hold the hoisting mechanism motionless; but as soon as the current passes through the armature it operates to lift the brake from the wheel, and to thus permit its rotation while the motor is in operation. This construction is shown in the drawings because it is the safest, for if the brake-magnet fails to act from any cause the hoisting mechanism will simply be restrained from motion and no accident to the car could occur. On the contrary, if the circuits be so arranged that the current would pass through the brake-magnet when turned off of the motor and operate to release the brake when the motor is in operation, then a failure of the brake-magnet to operate would deprive the hoisting mechanism and the suspended car of the entire restraint imposed by the brake and serious accidents might result. It is, however, immaterial to my invention whether the brake be actuated or lifted from the brake-wheel by the electro-magnetic energy.

When fixed conductors are used in the hoistway and moving contacts are attached to the car to carry the current to a car-switch, it will be understood that it is preferable to have one or more of the fixed conductors discontinuous or provided with breaks, as shown at 13, 30, and 31 in Fig. 7, so that the movement of the landing-switch may cut off the circuit through the car-switch, and thus prevent the latter from operating. It will also be noticed that in most of the constructions having a car-switch and landing-switches when two of the landing-switches are turned to make the car move in the same direction the car will move; but if two switches are shifted to move the car in contrary directions the car will not be moved, and in case a short circuit is produced in a system with constant potential a fuse will be required at some point in the connections to prevent damage to the dynamo which furnishes the current. It will also be noticed that where a landing-switch is used to normally close a circuit around a break in one of the car-switch conductors the movement of such landing-switch opens the circuit at such break, and the portion of the conductor beyond such landing-switch is wholly cut off from the current, and the car-switch, when the car is located beyond such break in the conductor, is wholly inoperative by its connection with such dead conductor and the movement of the car is controlled entirely by such landing-switch.

Many of the differences of construction shown herein are due merely to the provision required in circuits with constant current to avoid opening the circuit at any point, while in a system operated with constant potential the circuits are normally open and no current passes through a switch until moved, and if the motor is series wound it is not magnetized at all until a switch is moved; but with compound or shunt-wound motors the circuit through the field remains undisturbed by the operation of the switches, and all the changes necessary to operate the car either by the car or landing switches take place in the armature-circuit.

Although the shunt-circuit around the field is shown normally closed in the diagrams for constant potential, it is obvious that the circuits and switches could be so arranged as to cut the whole motor out of the circuit the same as with the constant-current system; but such an arrangement would be more complicated, and the advantage, except in cases where the elevator is seldom used, would not be sufficient to compensate for the additional cost of construction and liability to derangement.

My object in this entire elevator system has been to make it as complete as possible in respect to its simplicity, durability, and the certainty of its action, and at the same time avoiding needless complication. I do not therefore limit myself to the use of all the attachments, as landing-switches, door-locks, indicators, and automatic stops at the top and bottom of the hoistway, which I have described herein, but believe that the conditions frequently exist under which they would be desirable and necessary. Thus where an elevator is used in private houses it may frequently be operated by ladies, who could bring the car to any required landing by operating the switch fixed thereon, and in such cases it would obviously be very necessary to employ an automatic lock to hold the landing-door normally fastened until the car reached such landing, as by the bolts shown in Figs. 1 and 4.

Where no operator is employed to constantly ride upon the car and open the landing-doors from the inside, it is obvious that the door must be wholly unlocked, or some class of lock actuated by the car when it reaches the landing must be employed to prevent inexperienced persons from accidentally opening the door and walking into an open hoistway. Devices not magnetically operated may be employed to effect such result, and such a mechanical door-lock is shown in Fig. 4. $v^3$ is the bolt of the lock, which would be fitted through the door-frame, as shown in Fig. 1. $v^4$ is a bell-crank having one arm attached to the bolt and the other arm attached to a simple lever $v^5$, pivoted at $w^3$, and provided with a roller $v^6$ upon its free end to bear upon a seat $w^4$, formed on the side of the car. Such seat is formed with sloping sides and adapted, when the car approaches its resting-place at the landing from either direction, to press the roller sidewise and draw the bolt from the door to release the latter. Upon the car T in the same figure is shown the magnet L for a lock similar to that shown in Fig. 1, the electrical circuit through the magnet being connected with the wires 7 and 8 and closed by a plate $c^{10}$ upon the side of the car when at the landing. The mechanical lock and the electrical lock are both shown in this figure applied to the same door merely for convenience of illustration; but it is obvious that in practice only one lock would be applied to the same door, and that either system of locks would be applied to all the landing-doors upon the same hoistway.

It will be noticed that in the constructions described above for operating with conductors fixed in the hoistway and provided with breaks, as 13 in Figs. 5 and 6, or 30 and 31 in Figs. 6, 7, 8, and 9, the effect of the landing-switch upon the car-switch is such that if the switch below the car is moved to make the car go up the car will stand still, as the connections are designed only to bring the car down from an upper landing to such lower one. On the contrary, if the car be below the landing, the switch cannot be operated to make it go down; but if the car is either above or below the landing the switch will operate only to set it in motion toward that landing. If the switch is turned in the wrong direction, the car will not move. In consequence of such construction, when a landing-switch is properly turned to bring the car to such landing, the car will stop of its own accord when moved to such landing, because one or more of the contacts 12, 13, 14, or 15 will pass over the brakes in the discontinuous conductor and lose the electric current. Such operation of the switches when turned in the wrong direction will be perceived by tracing the course of the currents in Fig. 9, where the various switches are turned contrary to one another. To effect such result the break in each conductor is so constructed that the contact will pass over it just before or after the car is even with the landing. By such construction the car may be brought to the landing when moving in either direction, for if it lost the current just before reaching the landing the car would possess sufficient momentum to carry it thereto.

In all the figures except Fig. 18 the desired movements of the hoisting mechanism are effected by controlling the armature-circuit through the operation of the car or landing switches; but in this figure variations in the course of the current affect the magnetic field instead of the armature. In Fig. 18 the circuits are so arranged that the current passes continually through the armature and is cut off (to stop the motor) or reversed (to actuate it in opposite directions) by varying the course of the current in the field-coils. In some cases this is the best arrangement, as the resistance of the armature is much less than that of the field, and consequently absorbs much less energy when the motor is standing still. The electrical conductors and all the connections from the same to the car or landing switches would be unchanged in such a system, the alteration consisting merely in reversing the relations of the field-coils and commutator-brushes to the system by connecting the conductors 1 and 2 with the terminals of the field-coils, and the + line-wire being then connected to one of the brushes and the other brush being connected to conductor 3.

By comparing the connections of the conductors 1, 2, and 3 with the motors in Figs. 1 and 18 the character of the change will be apparent, and, indeed, is so simple as to be readily effected by changing the wires to any motor which is already connected with the conductors by the arrangement shown in Fig. 1.

The indicators $k^2$ are shown only in Fig. 6; but it is obvious that they may be connected with a branch circuit of varying electro-motive force in the systems illustrated in any of the other figures. In like manner the means (wedges $d'$) for shifting the car-switch automatically are shown only in Figs. 1 and 13, but may be applied to any of the constructions shown in the other figures, and to avoid the risk of accident in case such mechanism should not operate the switches $y^4$ and $y^5$ (shown in Fig. 10) may be used in addition to the mechanism shown in Fig. 1 for stopping the car at the ends of its normal travel.

In Fig. 6 a different construction for cutting out the motor at the ends of the car's travel is shown in the switches $y$ and $y'$, which may be substituted in any construction for the switches $y^{41}$ and $y^{51}$ shown in Fig. 10, the switches $x$ $x'$ shown in Figs. 6 and 10 being requisite in either of such latter cases to restore the current to the operative circuits traversed by the switches until the car is moved from its contact with the cut-out switch.

A brake-magnet M' is shown in the motor-circuit in nearly all the figures and operated the same as is described for Fig. 1, and the motor in nearly all the figures is represented merely by diagram, showing the armature and field magnet and the car by a mere rectangle with or without any apparent means of connection with the hoisting mechanism, it being understood that the car or hoisting-platform would be constructed of any desired shape and connected with the hoisting mechanism in any convenient manner.

I am fully aware that where an electric motor has been used to actuate an elevator-hoisting machine the brake connected with such hoisting apparatus has been magnetically operated and its operation controlled by a switch upon the car. In such case the function of the switch is merely to cut off the current from the brake-magnet, and such switch has no effect whatever in applying the power to the hoisting apparatus or removing the power therefrom.

While a brake may be said in a certain sense to control the movements of a hoisting apparatus, it is only by resisting the power or force exerted by such apparatus, and it may therefore operate while the armature of the electric motor is rotating and reduce the speed of such armature by a wasteful expenditure of force, or it may operate in a similar wasteful manner when the hoisting mechanism is rotated merely by the descent of the load. In neither case does the brake-switch affect the application of the power to the hoisting apparatus as in my invention. It will therefore be seen that the motor or other electro-magnetic device which is affected by the current passing through the circuits and switches of my system is generically different from a brake, and that any of my switches furnishes a means of applying the power to the hoisting apparatus or withdrawing such power from the same, and may be used either to stop or start the hoisting apparatus or to reverse its motion, if desired, while simultaneously actuating the brake.

Where the motor for operating the hoisting apparatus is placed in circuit with other apparatus, as in systems for the distribution of light or power by an electric current from a central station, it is obvious that the current in the circuit would be kept either at constant potential or constant strength, and that the apparatus would require to be connected in multiple arc with such circuit or arranged in series with the other apparatus therein. In the former case the switches would in my construction be provided with artificial resistances to avoid throwing the current into the electric motor until its armature-rod set up a counter electro-motive force, and in the latter case the switch levers or connectors would require to connect the adjacent contacts in the switch when moved from one to another to prevent an open circuit.

I hereby disclaim the mere actuation of a brake by an electro-magnet having its coils in a circuit connected with a switch upon the car. In the construction I have shown herein to operate with constant current it will be understood that the circuit cannot be opened even if all the switches are moved at the same time, and that the switches adapted for a current of constant potential are shown in all cases provided with the resistances $r$ to prevent the current from flowing into the motor until a counter electro-motive force is set up therein.

While I have claimed the electrical system herein described without reference to the use of any particular form of switch or arrangement of switches, I have in the three other applications referred to herein made specific claim to circuits to operate expressly with landing-switches, and have in such applications claimed many of the details of construction which are shown herein but not specifically claimed.

Having thus set forth the nature of my invention, what I claim herein is—

1. In an electric-elevator system in which the motion of an electric motor is transmitted to the car by means of a hoisting-pulley, intermediate mechanism, and a hoisting-rope, the combination, with the motor-circuit, of a switch located upon the car and arranged and operated to reverse the motion of the car by reversing the motor and to stop the car by stopping the motor, substantially as herein set forth.

2. In an electric elevator system, the combination, with a suspended car moving in a hoistway provided with landings, of hoisting mechanism operated by an electric motor, electrical conductors, and a circuit connecting the motor with the car and with the said landings, and switches upon the car and upon the landings connected with said circuit and provided each with contacts and with a movable lever or connector adapted to vary the course of the current in the motor, as and for the purpose set forth.

3. The combination, with a suspended car moving in a hoistway, of hoisting mechanism operated by an electric motor, electrical conductors, and a circuit connecting the motor with the car, a car-switch located therein to control the movements of the hoisting mechanism, and a door-switch located in a branch of such circuit and operated by the opening of the door to stop the motor, as and for the purpose set forth.

4. The combination, with a suspended car moving in a hoistway, of hoisting mechanism operated by an electric motor, a motor-circuit supplied with a current of constant strength, circuits interposed between one or both of the terminals of the field and the armature and between the armature and one or both of the terminals of the line, and one or more switches located therein and arranged in or along the path of the car and operated to reverse or stop the movement of the armature, as herein set forth.

5. The combination, with a suspended car moving in a hoistway, of hoisting mechanism operated by an electric motor, a motor-circuit supplied with a current of constant strength, a car-switch located therein to control the movements of the hoisting mechanism, and a landing-switch located in such circuit and operating normally to complete said circuit, as and for the purpose set forth.

6. In an electric-elevator system operated by a constant current, the combination, with a suspended car moving in a hoistway having landings and landing-doors, of an electric motor and hoisting mechanism operated thereby, a motor-circuit, and door-switches arranged in the said circuit and operated by the opening of the doors to short-circuit the motor and to thus stop the same until the door is closed, substantially as set forth.

7. The combination, with a suspended car moving in a hoistway, of hoisting mechanism operated by an electric motor, an electric circuit for operating the motor, a car-switch located therein and operating normally to stop the said motor and when moved in opposite directions to close reverse circuits through the motor-armature, and a door-switch located in a branch of such circuit, and operating, substantially as described, to stop the car by the opening of the door when the car is moved to such door by the shifted car-switch, and adapted when the door is closed to complete the circuit through such shifted car-switch and start the car in the same direction, substantially as herein set forth.

8. In an electric-elevator system, the combination, with a suspended car moving in a hoistway provided with landings, of hoisting mechanism operated by an electric motor, electrical conductors fixed in the hoistway and connected with an electric generator and with the motor, moving contacts pressed on such conductors and affixed to the car, a switch upon the car connected with such moving contacts, a branch circuit connected with the conductors beyond the movement of such contacts, a switch $e^6$ in said circuit, and a connection from the switch to each landing adapted to actuate the switch by the opening of the door at each landing to prevent the starting of the motor until the door is closed, substantially as set forth.

9. The combination, with a suspended car moving in a hoistway, of hoisting mechanism operated by an electric motor, a motor-circuit supplied with a current of constant strength, a car-switch located therein to control the movements of the hoisting mechanism, and a landing-switch located in such circuit and operating normally to complete said circuit and provided with additional contacts adapted when opening the circuit to close a branch circuit and to thereby avoid an open circuit in any position of the said switch, as set forth.

10. The combination, with a suspended car moving in a hoistway, of hoisting mechanism operated by an electric motor, a motor-circuit supplied with a current of constant strength, a car-switch located therein to control the movements of the hoisting mechanism, and a landing-switch located in such circuit and operating normally to complete said circuit and operating when moved to close branch circuits for actuating the hoisting mechanism, as set forth.

11. The combination, with a suspended car moving in a hoistway, of hoisting mechanism operated by an electric motor, a motor-circuit supplied with a current of constant strength, a car-switch located therein to control the movements of the hoisting mechanism, and a landing-switch located in such circuit and operating normally to complete said circuit and operating when moved in opposite directions to close branch circuits through the motor-armature in opposite directions, as set forth.

12. The combination, with a suspended car moving in a hoistway, of hoisting mechanism operated by an electric motor, a motor-circuit supplied with a current of constant strength, a car-switch located therein to control the movements of the hoisting mechanism, and a series of landing-switches located in said circuit and provided with suitable contacts to normally close said circuit and to connect them in series and operating each when moved to close a branch circuit through the motor-armature, as set forth.

13. The combination, with a suspended car moving in a hoistway, of hoisting mechanism operated by an electric motor, a motor-circuit supplied with a current of constant strength, a car-switch located therein to control the movements of the hoisting mechanism, and a series of landing-switches located in said circuit and provided with suitable contacts to normally close said circuit and to connect them in series, and the said switches being provided with other contacts to close branch circuits in opposite directions through the motor-armature for actuating the hoisting mechanism, substantially as set forth.

14. In an electric-elevator system operated by an electric motor, the combination, with a hoistway provided with landings and landing-doors, of a door-lock having a bolt operating normally to secure the door, an electro-magnet for operating or retracting the door-bolt and having its coils in a branch of the motor-circuit, and a switch in such branch circuit operated by the car when at the landing, as and for the purpose set forth.

15. In an electric-elevator system, the combination, with a suspended car moving in a hoistway, of hoisting mechanism operated by an electric motor, a motor-circuit with a landing-switch located therein, an electrical indicator located at the landing, and a derived circuit connected with the same and adapted to operate the electrical indicator, as set forth, and an indicator-switch at the landing for opening and closing such indicator-circuit, substantially as described.

16. In an electric-elevator system, the combination, with a suspended car moving in a hoistway, hoisting mechanism operated by an electric motor, a landing provided with a landing-switch in the motor-circuit for regulating the motion of the motor, an electric indicator located at the landing, a circuit derived from the motor-armature and adapted to operate the electric indicator, as set forth, and an indicator-switch located in such circuit at the landing for opening and closing such derived circuit to operate the electric indicator, as and for the purpose set forth.

17. In an electric-elevator system, the combination, with a suspended car moving in a hoistway, of hoisting mechanism operated by an electric motor, a motor-circuit with a landing-switch located therein, an electrical indicator located at such landing and connected electrically with the commutator-brushes of the motor, and an indicator-switch at the landing for opening and closing such indicator-circuit, substantially as set forth.

18. In an electric-elevator system, the combination, with a suspended car moving in a hoistway, of hoisting mechanism operated by an electric motor, electrical conductors fixed in the hoistway and connected with an electric generator and with the motor, moving contacts pressed on such conductors and affixed to the car, and a switch upon the car connected with such moving contacts and adapted to vary the current through the motor to vary its movements in the desired manner, substantially as set forth.

19. In an electric-elevator system, the combination, with a suspended car moving in a hoistway, of hoisting mechanism operated by an electric motor, electrical conductors fixed in the hoistway and connected electrically with a generator and with the motor, moving contacts pressed on such conductors and affixed to the car, a switch upon the car connected with such moving contacts, and one or more of the conductors being interrupted with connections at each side of the break for a landing-switch, and a landing-switch operating normally to maintain the circuit through such broken conductor, as and for the purpose set forth.

20. In an electric-elevator system, the combination, with a suspended car moving in a hoistway, of hoisting mechanism operated by an electric motor, four electrical conductors fixed in the hoistway, four moving contacts attached to the car and adapted to press on said conductors, two of the said conductors being connected electrically with the commutator-brushes of the motor and the other two being connected directly or indirectly with the positive and negative wires from the generator, and a switch upon the car connected with such contacts and adapted to reverse the current through the commutator, substantially as set forth.

21. In an electric-elevator system, the combination, with a suspended car moving in a hoistway, of hoisting mechanism operated by an electric motor, four electrical conductors fixed in the hoistway, four moving contacts attached to the car and adapted to press on said conductors, two of the said conductors being connected electrically with the commutator-brushes of the motor, one with the end of the field-coils and the other with one end of the line-wire, and a switch upon the car connected with such contacts and adapted to connect each of the commutator-brushes alternately with the field-coils and with the said line-wire, substantially as set forth.

22. In an electric-elevator system, the combination, with a hoistway provided with one or more landings, of hoisting mechanism operated by an electric motor, four electrical conductors fixed in the hoistway, one or more of said conductors being broken at a landing, but adapted for the passage of a moving contact, four contacts upon the car pressed upon such conductors, a circuit connecting the motor with the car through certain of said conductors, a car-switch connected with said contacts and operating normally to close the circuit around the motor-armature, and a landing-switch operating to normally close the circuit around the break in the broken conductor and provided with additional contacts adapted when opening the circuit at the break to close a circuit through the other conductors and through the motor to operate the same, substantially as set forth.

23. In an electric-elevator system, the combination, with a hoistway provided with a series of landings, of hoisting mechanism operated by an electric motor, four electrical conductors fixed in the hoistway, one or more of said conductors being broken at each landing, but adapted for the passage of a moving contact, four contacts upon the car pressed upon such conductors, a circuit connecting the motor with the car through certain of said conductors, a car-switch connected with said contacts and operating normally to close a circuit around the motor-armature, and a series of switches located at the landings and operating normally to close the circuit around the several breaks in the broken conductors and provided with additional contacts adapted to close branch circuits in opposite directions through the motor-armature, as and for the purpose set forth.

24. In an electric-elevator system, the combination, with a hoistway provided with a series of landings, of hoisting mechanism operated by an electric motor, four electrical conductors fixed in the hoistway, one or more of said conductors being broken at each landing, but adapted for the passage of a moving contact, four contacts upon the car pressed upon such conductors, a car-switch connected with said contacts and operating normally to close a circuit around the motor-armature, and a series of switches located at the landings and operating normally to close the circuit around the several breaks in the broken conductor or conductors, and the car-contact for the broken conductor being arranged to move from the break in opposite directions when the car moves from the landing up and down, so as to cut off the car-switch from the main circuit, except through the landing-switch connected around such break, substantially as set forth.

25. In an electric-elevator system operated by a constant current, the combination, with a suspended car moving in a hoistway having landings and landing-doors, of door-switches arranged and operated by the opening of the doors to short-circuit the motor and to thus stop the same until the door is closed, substantially as set forth.

26. The combination, with a suspended car moving in a hoistway, of hoisting mechanism operated by an electric motor, an electric circuit for operating the motor, a car-switch located therein and operating normally to stop the said motor and when moved in opposite directions to close reverse circuits through the motor-armature, and a door-switch located in a branch of such circuit and operating, substantially as described, to stop the car when moved to such door with the car-switch shifted and adapted when the door is closed to complete the circuit through such shifted car-switch to start the car in the same direction, substantially as herein set forth.

27. In an electric-elevator system, the combination, with a suspended car moving in a hoistway provided with landings, of hoisting mechanism operated by an electric motor, electrical conductors fixed in a hoistway and connected with an electric generator and with the motor, moving contacts affixed to the car and pressed upon such conductors, a switch upon the car connected with such moving contacts, a break in one of the conductors beyond the movement of such contacts, a branch circuit connected with the broken conductor at the opposite sides of such break, and a door-switch held normally open in such branch circuit at each landing and closed by the opening of the door at such landing to prevent the starting of the motor until the door is closed, substantially as herein set forth.

28. In an electric-elevator system operated by a constant current, the combination, with a suspended car moving in a hoistway having landings and landing-doors, of door-switches actuated by the opening and closing of the doors to close and open a circuit between the main line on one side of the motor and the main line on the opposite side of the motor and thus operating to short-circuit the motor when any of the said doors is open, substantially as set forth.

29. In an electric-elevator system, the combination, with a suspended car moving in a hoistway provided with landings, of hoisting mechanism operated by an electric motor, electrical conductors and a circuit connecting the motor with the car and with the said landings, and switches upon the car and upon the landings connected with said circuit and provided each with contacts and with a movable lever or connector adapted to reverse the motion of the car by reversing the motor and to stop the car by stopping the motor, substantially as herein set forth.

30. In an electric-elevator system in which the motion of an electric motor is transmitted to the car by means of a hoisting-pulley, intermediate mechanism, and a hoisting-rope, the combination, with a hoistway provided with landings, of a motor-circuit, a switch located upon the car, and one or more switches located upon the landings, all of the said switches being located in the motor-circuit and arranged and operated to reverse the motion of the car by reversing the motor and to stop the car by stopping the motor, substantially as herein set forth.

31. In an electric-elevator system in which the motion of an electric motor is transmitted to the car by means of a hoisting-rope, the combination, with such rope, of a hydraulic cylinder with piston and rod for actuating such rope, a reversible pump actuated by the electric motor for operating such hydraulic piston, a motor-circuit, and a car-switch located in said circuit and operating to reverse or to stop the motor and to thereby reverse and stop the hydraulic pump, as and for the purpose set forth.

32. In an electric-elevator system in which the motion of an electric motor is transmitted to the car by means of a hoisting-rope, the combination, with such rope, of a hydraulic cylinder with piston and rod for actuating such rope, a reversible pump actuated by the electric motor for operating such hydraulic piston, a hydraulic accumulator connected with the cylinder and operated to overbalance the weight of the car, a motor-circuit, and a car-switch located in said circuit and operating to reverse or to stop the motor and to thereby reverse and stop the hydraulic pump, as and for the purpose set forth.

33. The combination, with a stationary electric motor, hoisting mechanism actuated thereby, and a suspended car moved by such hoisting mechanism, of a primary circuit to actuate said motor, a motor-switch in such circuit provided with contacts to stop or reverse the motion of the motor, an electro-magnet with movable magnetic armature for moving the said switch, an independent electrical circuit connected with such electro-magnet, and one or more switches arranged in or near the path of the car in such independent circuit and provided with contacts to reverse the current through such electro-magnetic device and to thereby actuate the motor-switch, substantially as herein set forth.

34. In an electric-elevator system in which a car or platform hoisting device is operated by a stationary electric motor and the motor is stopped and started to stop and start the hoisting mechanism, the combination, with the motor-circuit, of a magnetically-operated brake applied to the hoisting mechanism and having its magnet-coils in the motor-circuit, and a switch located in the said circuit and constructed and operated to close the circuit simultaneously through the motor and through the brake-magnet, as and for the purpose set forth.

35. In an electric-elevator system in which a car or platform hoisting device is operated by a stationary electric motor and the motor is stopped and started to stop and start the hoisting mechanism, the combination, with the motor-circuit, of a brake pressed normally upon the hoisting-pulley, an electro-magnet for withdrawing the brake and having its coils in the said motor-circuit, and a switch located in the said circuit and constructed and operated to remove the brake from the hoisting-pulley when starting the motor by simultaneously closing the circuit through the motor and the brake-magnet, substantially as herein set forth.

36. In an electric-elevator system, the combination, with a moving car and a hoistway provided with landings and landing-doors, of hoisting mechanism operated by an electric motor, a magnetically-operated brake applied to the hoisting mechanism, electrical conductors fixed in the hoistway, contacts pressing on such conductors and affixed to the car, a switch upon the car connected with such sliding contacts adapted to reverse the motor when desired, a circuit through the electric motor and the brake-magnet, and landing-switches connected with such circuit and connected also with the car-switch through the conductors and provided with contacts adapted to close the circuit through the car-switch, the motor, and the brake-magnet when the landing-switches are in their neutral position and the car-switch in operation, substantially as set forth.

37. In an electric-elevator system in which a car or platform hoisting device is operated by a stationary electric motor, the combination, with the electric motor and the car or platform moved thereby, of an operative electric circuit and a switch actuated by the movement of the car at the extreme opposite ends of its travel to stop the car at such points, substantially as herein set forth.

38. In an electric-elevator system in which a car or platform hoisting device is operated by a stationary electric motor, the combination, with the electric motor and the car or platform moved thereby, of an operative electric circuit, electrical conductors for conveying the current to and from the moving car, and a switch upon the car connected with said conductors and provided with contacts to reverse the electric current and actuated by the movement of the car at the extreme opposite ends of its travel to stop the car at such points, substantially as herein set forth.

39. In an electric-elevator system, the combination, with the electric motor and with the conductors 1, 2, 3, and 4 connected thereto to shut off or reverse the current through the same, of the breaks 30 and 31 provided at the landings in the conductors 3 and 4, and landing-switches provided each with fixed contacts electrically connected with the conductor 3 above and below the break 30 with fixed contacts electrically connected with the conductor 4 above and below the break 31, a fixed contact connected with the conductor 2 and a fixed contact connected with the conductor 1, and four movable springs or contact-plates 26 27 28 29, the several contacts being arranged and operated when the four movable contacts are moved in one direction to connect the conductor 3 above the break 30 with the conductor 1, as shown at the lower switch in Fig. 7, and to cut off the current from conductor 3 below the break 30, and at the same time to connect the conductor 4 below the break 31 with the conductor 2 and to cut off the current in the conductor 4 above the break 31, and the stationary contacts being arranged when the four movable contacts are turned in the opposite direction to reverse the connections of the conductors 3 and 4 with the conductors 1 and 2 to reverse the current through the motor, and the movable contacts being adapted when in their intermediate position to connect the conductor 3 above the break 30 with the same conductor below the break and the conductor 4 above the break 31 with the same conductor below the break, as and for the purpose set forth.

40. In an electric-elevator system in which a car or platform hoisting device is operated by a stationary electric motor, the combination, with the electric motor and the car-platform moved thereby, of an electric circuit, electrical conductors for conveying the current in said circuit to and from the car, a switch upon the car connected with said conductors through contacts adapted when the switch is in its neutral position to stop the hoisting mechanism actuated by the motor, and a projection from the switch actuated at the ends of the hoistway by dogs adapted to throw the switch into its neutral position and to thereby automatically stop the car at the proper limits of its travel, substantially as herein set forth.

41. In an electric-elevator system, the combination, with a hoistway provided with landings and landing-doors, of a door-bolt projected normally through the door-frame into the door, a lever applied to such bolt and extended into the hoistway, and a projection upon the car adapted to operate upon such lever or extension to withdraw the bolt when the car is at the landing adjacent to such door, as and for the purpose set forth.

42. In an electric-elevator system in which the electric motor is connected in a circuit supplied with a regulated current derived from a central station for the distribution of power, as described, the combination, with a suspended car moving in a hoistway, of hoisting mechanism operated by an electric motor, electrical conductors and a circuit connecting the motor with the car, and one or more switches located in such circuit and provided with a movable lever or connector and with contacts adapted to maintain the circuit, as required, when the connector is moved and to vary the course of the current in the motor to stop or start the same, as and for the purpose set forth.

In testimony whereof I have hereunto set my hand in the presence of two subscribing witnesses.

WILLIAM BAXTER, Jr.

Witnesses:
L. LEE,
THOS. S. CRAM.